(12) United States Patent
Anslot et al.

(10) Patent No.: US 11,064,346 B2
(45) Date of Patent: Jul. 13, 2021

(54) METHOD FOR TRANSMITTING AN EXISTING SUBSCRIPTION PROFILE FROM A MOBILE NETWORK OPERATOR TO A SECURE ELEMENT, CORRESPONDING SERVERS AND SECURE ELEMENT

(71) Applicant: THALES DIS FRANCE SA, Meudon (FR)

(72) Inventors: Michel Anslot, Meudon (FR); Marc Lamberton, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/483,127

(22) PCT Filed: Feb. 2, 2018

(86) PCT No.: PCT/EP2018/052631
§ 371 (c)(1),
(2) Date: Aug. 2, 2019

(87) PCT Pub. No.: WO2018/141896
PCT Pub. Date: Aug. 9, 2018

(65) Prior Publication Data
US 2020/0236538 A1    Jul. 23, 2020

(30) Foreign Application Priority Data

Feb. 3, 2017  (EP) ................................. 17305124
Feb. 24, 2017 (EP) ................................. 17305204

(51) Int. Cl.
*H04M 1/66* (2006.01)
*H04W 72/00* (2009.01)
(Continued)

(52) U.S. Cl.
CPC ............. *H04W 8/205* (2013.01); *H04L 5/14* (2013.01); *H04L 61/2061* (2013.01);
(Continued)

(58) Field of Classification Search
CPC . H04W 12/0023; H04W 12/06; H04W 12/04; H04W 8/205; H04W 8/183; H04W 4/50; H04L 63/0853; H04L 61/6054
(Continued)

(56) References Cited

U.S. PATENT DOCUMENTS

| | | | |
|---|---|---|---|
| 2004/0005892 A1* | 1/2004 | Mayer | H04W 8/08 |
| | | | 455/432.1 |
| 2004/0069853 A1* | 4/2004 | Aharonson | G07F 7/1008 |
| | | | 235/454 |

(Continued)

FOREIGN PATENT DOCUMENTS

| | | |
|---|---|---|
| EP | 2461613 A1 | 6/2012 |
| EP | 3035724 A1 | 6/2016 |

(Continued)

OTHER PUBLICATIONS

International Preliminary Report on Patentability (PCT/IPEA/409) dated Apr. 23, 2019, by the European Patent Office as the International Preliminary Examining Authority for International Application No. PCT/EP2018/052631.
(Continued)

*Primary Examiner* — Mark G. Pannell
(74) *Attorney, Agent, or Firm* — Buchanan Ingersoll & Rooney PC

(57) ABSTRACT

A method for transmitting a subscription profile from an MNO to a secure element pre-provisioned with a temporary profile comprising a unique identifier, MCC and MNC, includes:—Transmitting from the MNO the unique identifier to a SM-DP;—Creating the subscription profile at the SM-
(Continued)

| MCC | MNC | MSIN | | IMSI standard format |
|---|---|---|---|---|

| MCC1 | MNC1 | 0 | Payload | Format 31 |
|---|---|---|---|---|

| MCC1 | MNC1 | Correl-ID | Payload | Format 32 |
|---|---|---|---|---|

90.000
Values

DP;—Provisioning in a D-HSS server having the first MCC/MNC the unique identifier and a temporary IMSI comprising a second MCC, a second MNC;—Provisioning in the MNO the temporary IMSI and an ephemeral key;—At the first attempt of the secure element to connect to the D-HSS server, exchanging data in signaling messages for provisioning the secure element with the temporary IMSI;—At the next attempt of the secure element to connect to the MNO network with the temporary IMSI, open an APN and send from the SM-DP to the secure element the subscription profile.

2 Claims, 18 Drawing Sheets

(51) Int. Cl.
| | |
|---|---|
| H04W 8/20 | (2009.01) |
| H04W 76/10 | (2018.01) |
| H04L 29/06 | (2006.01) |
| H04L 5/14 | (2006.01) |
| H04W 8/18 | (2009.01) |
| H04W 8/26 | (2009.01) |
| H04W 4/70 | (2018.01) |
| H04L 29/12 | (2006.01) |
| H04W 48/18 | (2009.01) |
| H04W 4/50 | (2018.01) |
| H04W 12/04 | (2021.01) |
| H04W 12/06 | (2021.01) |
| H04W 12/30 | (2021.01) |
| H04W 12/041 | (2021.01) |
| H04W 12/069 | (2021.01) |
| H04W 12/42 | (2021.01) |

(52) U.S. Cl.
CPC ...... *H04L 61/2092* (2013.01); *H04L 63/0853* (2013.01); *H04L 67/42* (2013.01); *H04W 4/50* (2018.02); *H04W 4/70* (2018.02); *H04W 8/183* (2013.01); *H04W 8/26* (2013.01); *H04W 8/265* (2013.01); *H04W 12/04* (2013.01); *H04W 12/041* (2021.01); *H04W 12/06* (2013.01); *H04W 12/069* (2021.01); *H04W 12/35* (2021.01); *H04W 48/18* (2013.01); *H04W 76/10* (2018.02); *H04L 61/6054* (2013.01); *H04W 12/42* (2021.01)

(58) Field of Classification Search
USPC .......................................................... 455/411
See application file for complete search history.

(56) References Cited

U.S. PATENT DOCUMENTS

| | | | |
|---|---|---|---|
| 2008/0260149 A1* | 10/2008 | Gehrmann | G06Q 20/3821 380/247 |
| 2012/0155324 A1* | 6/2012 | Janakiraman | H04W 12/06 370/254 |
| 2014/0364087 A1* | 12/2014 | El Mghazli | H04W 8/183 455/411 |
| 2015/0181024 A1* | 6/2015 | El Mghazli | H04B 1/3816 455/411 |
| 2016/0019381 A1* | 1/2016 | Yang | G06F 21/34 726/9 |
| 2017/0180995 A1* | 6/2017 | Deshpande | H04L 63/0414 |
| 2018/0060199 A1* | 3/2018 | Li | G06F 11/1433 |
| 2019/0364415 A1* | 11/2019 | Gao | H04W 8/205 |

FOREIGN PATENT DOCUMENTS

| | | |
|---|---|---|
| WO | 2013039900 A1 | 3/2013 |
| WO | 2015018531 A1 | 2/2015 |

OTHER PUBLICATIONS

International Search Report (PCT/ISA/210) and Written Opinion (PCT/ISA/237) dated May 4, 2018, by the European Patent Office as the International Searching Authority for International Application No. PCT/EP2018/052631.
Search Report dated Jan. 4, 2018, by the European Patent Office for Application No. 17305204.4.

* cited by examiner

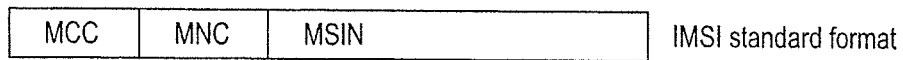
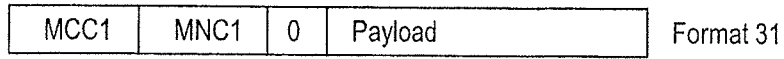
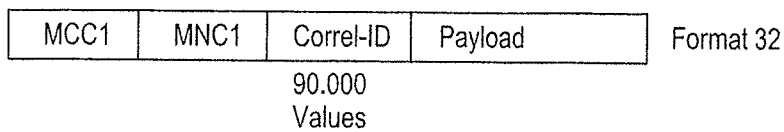
Fig. 3
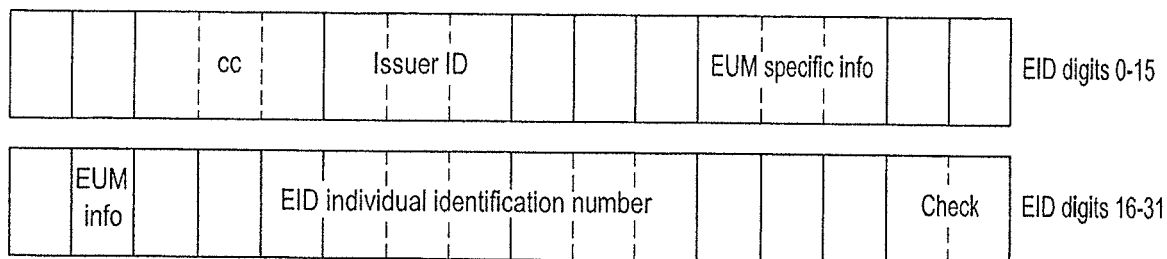
Fig. 11
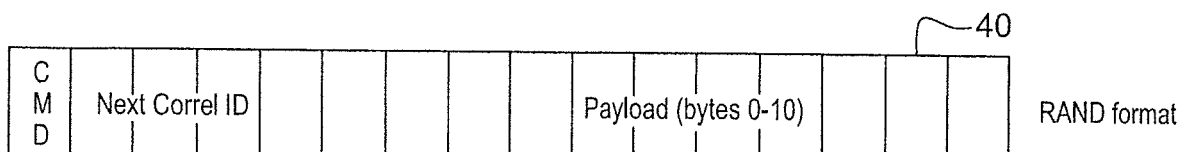
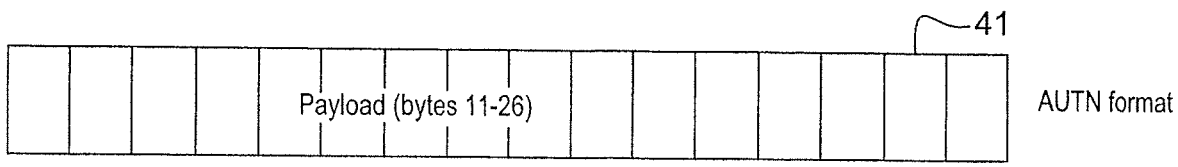
Fig. 4

FIG. 5

| Command value (hexadecimal) | Command name | eUICC+ actions |
|---|---|---|
| 0x00 | Retry later | The D-HSS is not ready to handle the new eUICC+ request. The eUICC shall retry later (10s + random [0..10]s) |
| 0x01 | Next EID digits | The D-HSS requests to the eUICC+ to provide the subsequence EID digits (10-11-12). |
| 0x02 | IMSI switch | When the eUICC receives this command, it shall change the IMSI value of its default profile to the value specified in the 15 first bytes of the RAND+AUTN payload.<br>It shall then send a REFRESH proactive command to force the handset to reattach with the new IMSI value. |
| 0x03 | Prompt user | When the eUICC+ receives this command, it shall use the STK to prompt the end-user with the message provided in the payload. |
| 0x04 | Prompt user and collect data | When the eUICC+ receives this command, it shall use the STK to prompt the end-user with the message provided in the payload. It shall then collect the digits entered by the end-user and encode them into the next attach request. It shall then issue a REFRESH proactive command to force the handset to reattach with the new IMSI value.<br><br>The end-user can enter up to 3 capital letters or numerical digits (A-Z, 0-9) → 46,656 values encoded into the 5 digits of format 32 payload. |
| 0x05 to 0x0F | Reserved | Reserved for future use. |

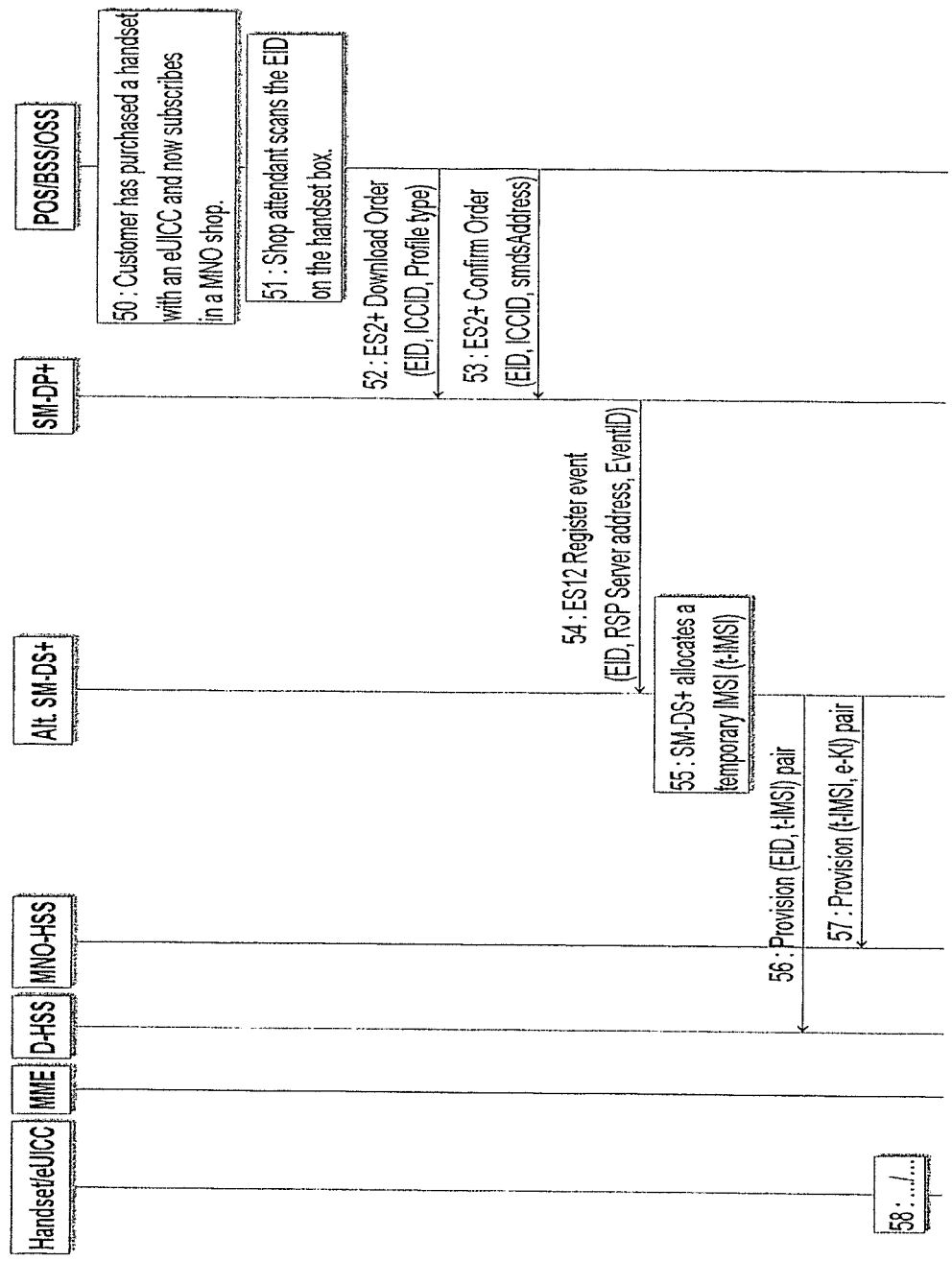
FIG. 8 (part 1)

FIG. 8 (part 2)
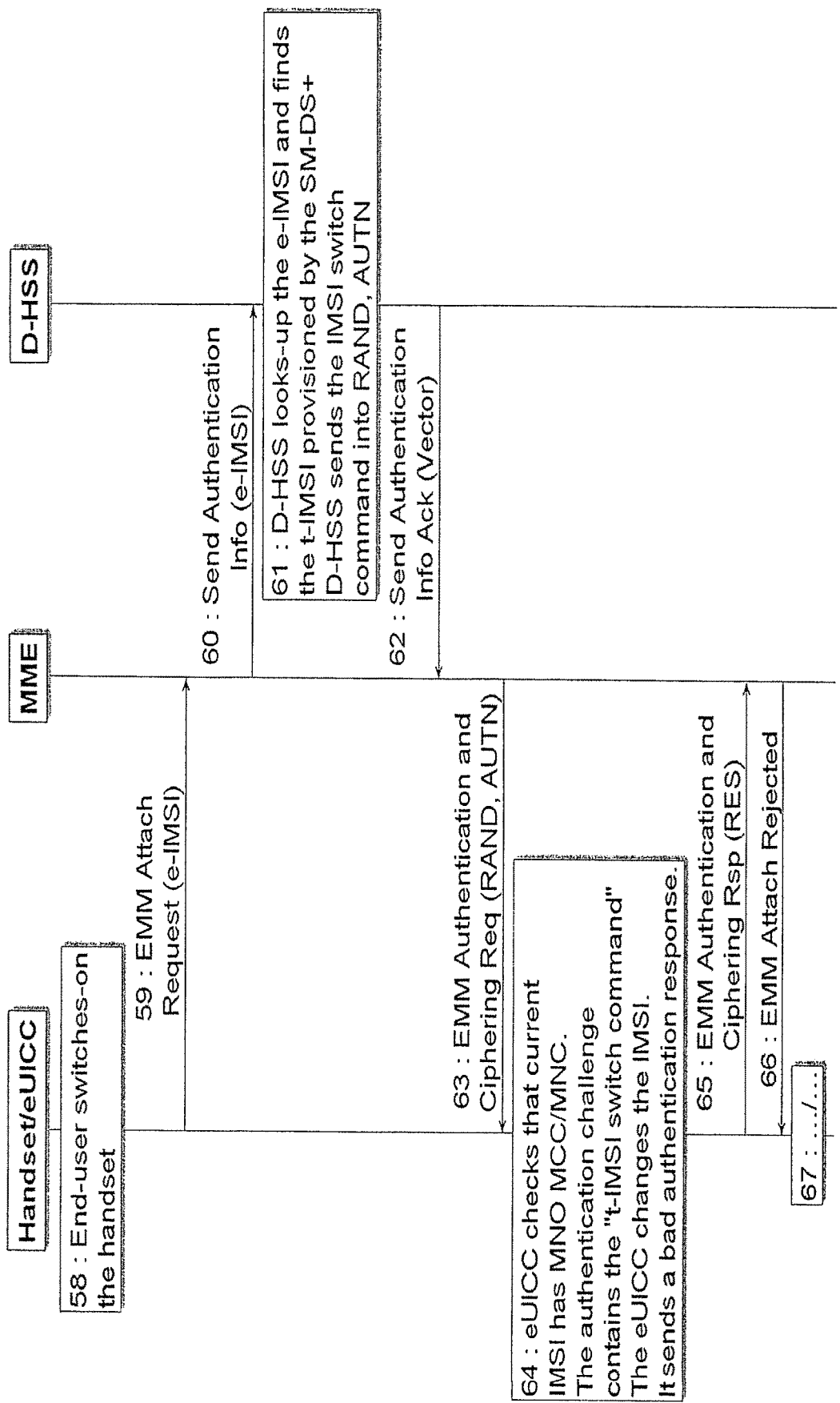

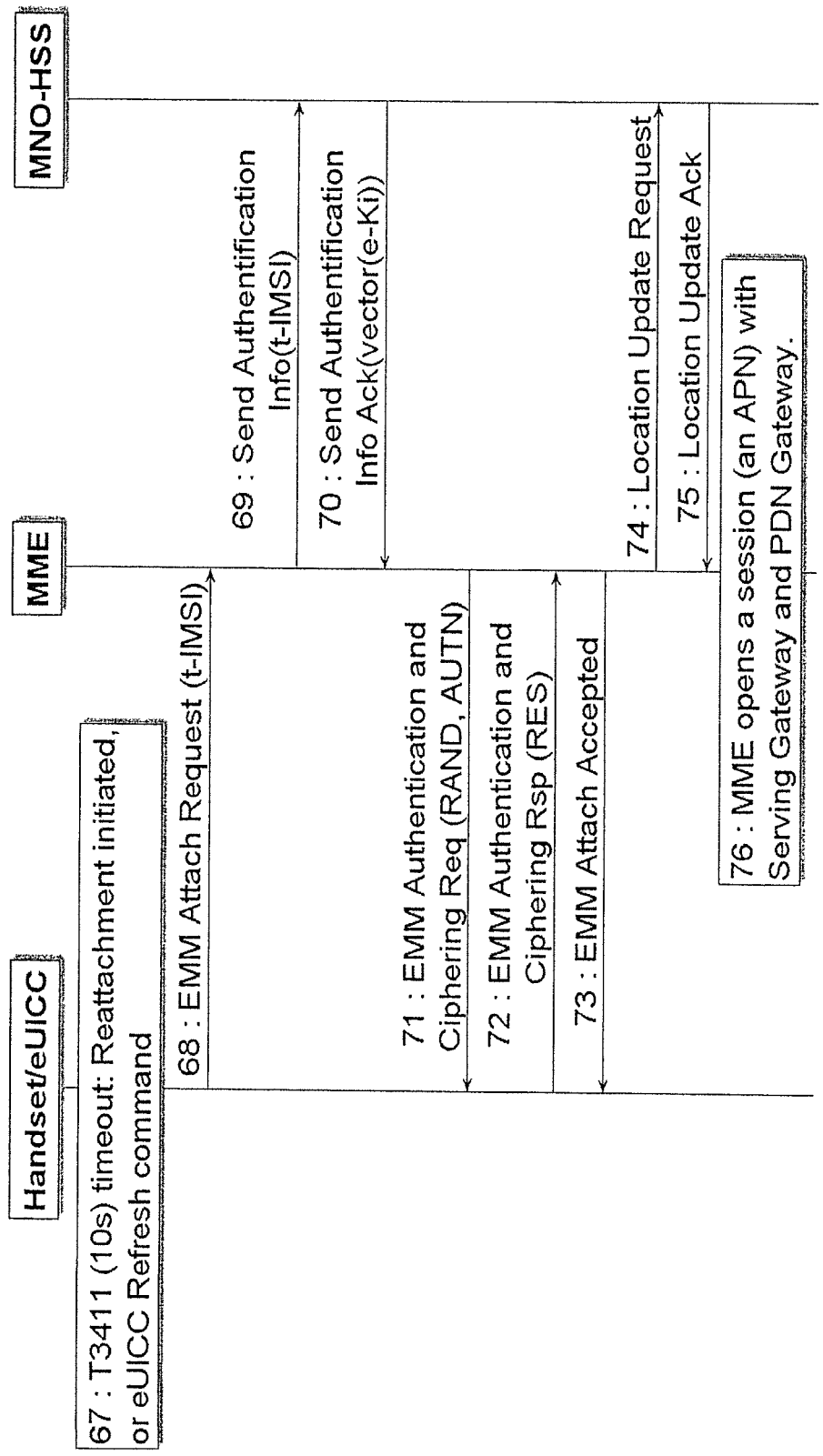
FIG. 8 (part 3)

FIG. 9 (part 1)
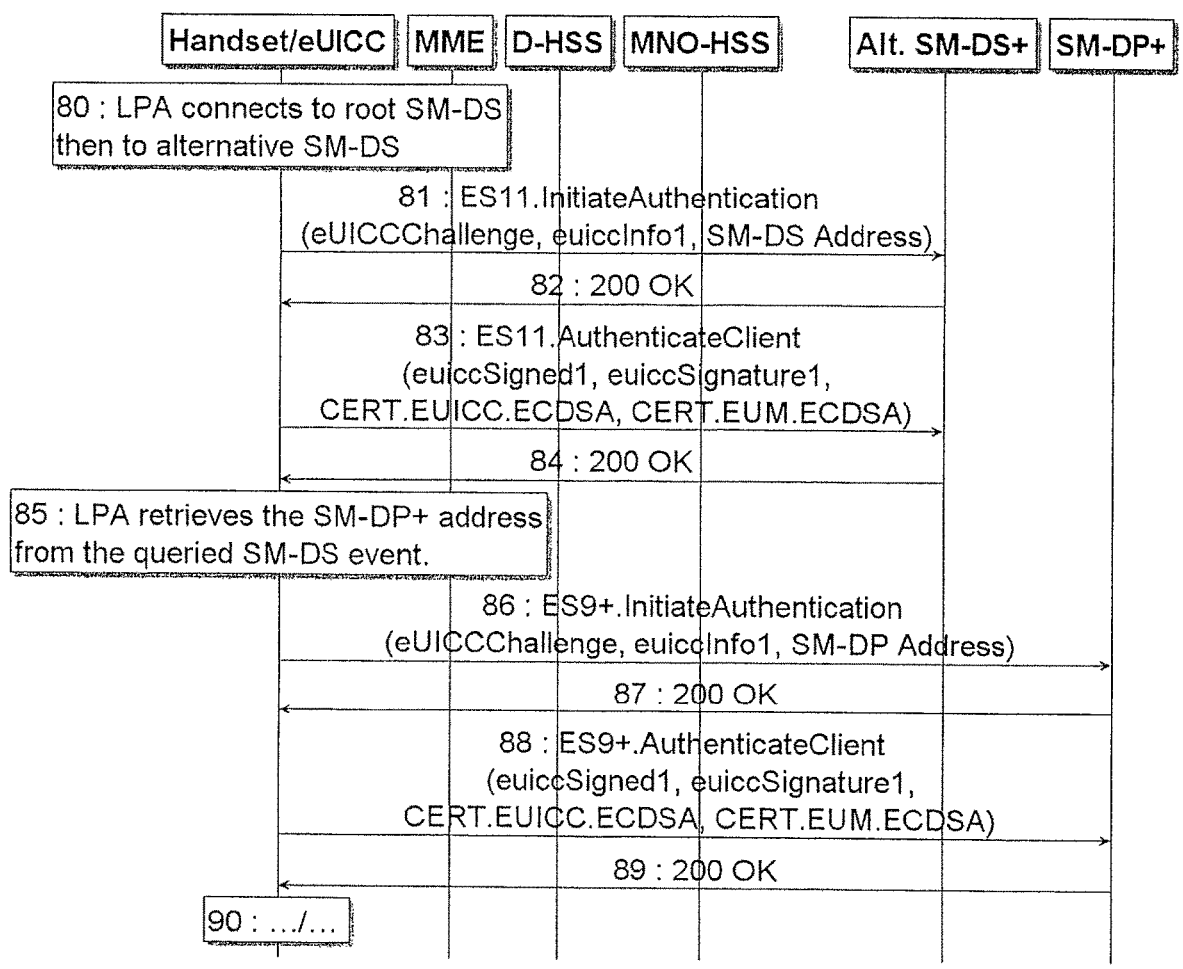

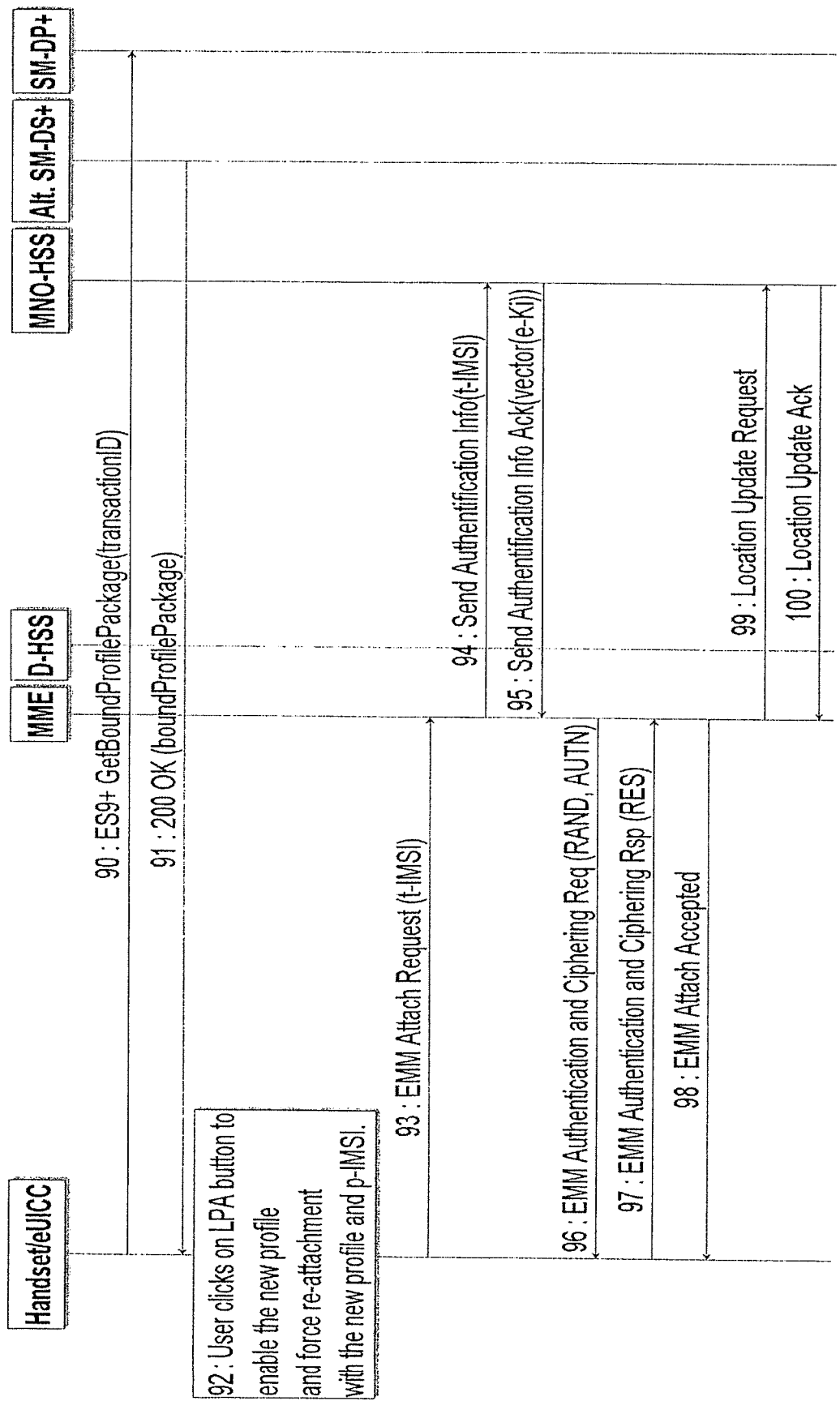
FIG. 9 (part 2)

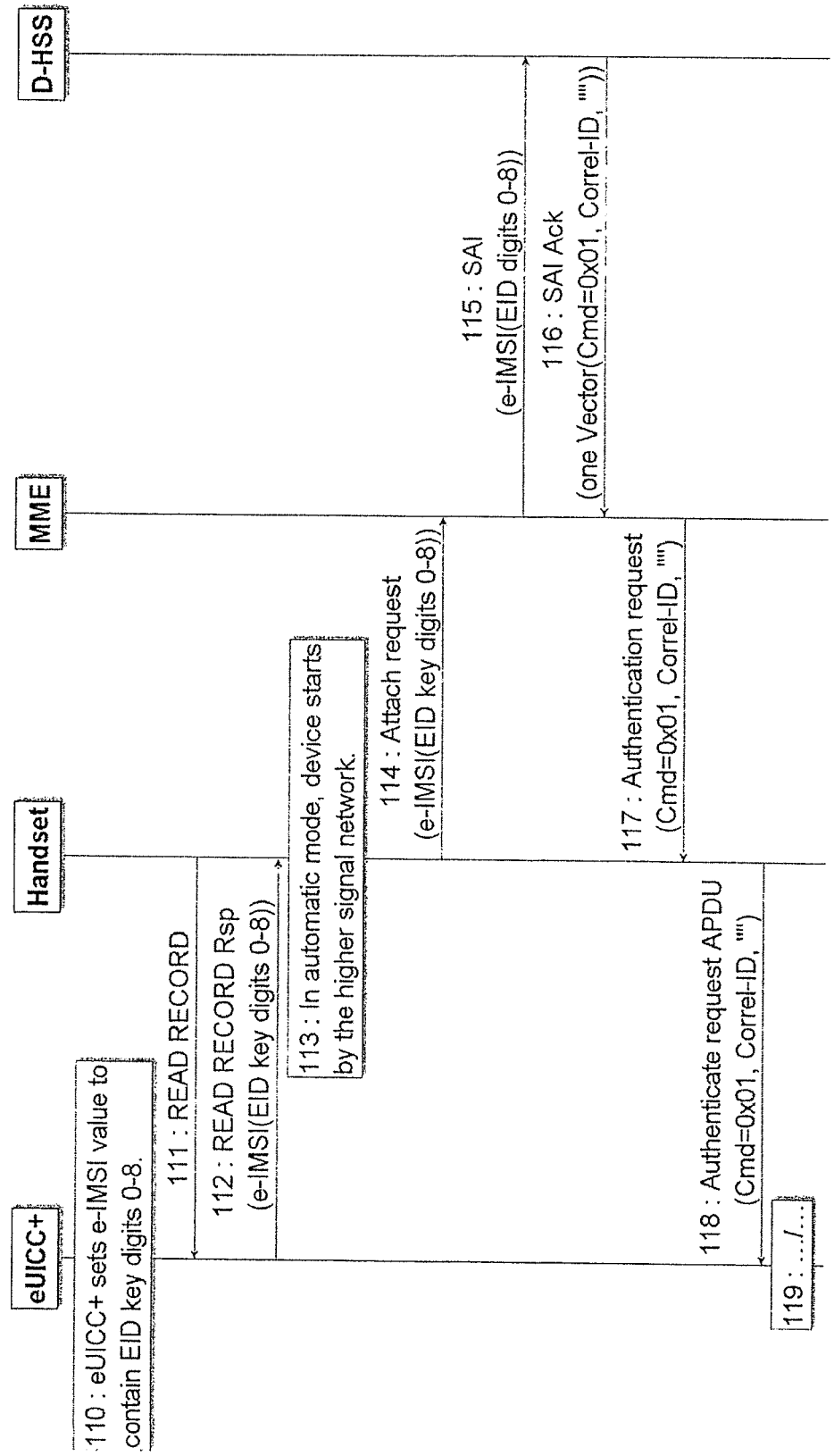
FIG. 10 (part 1)

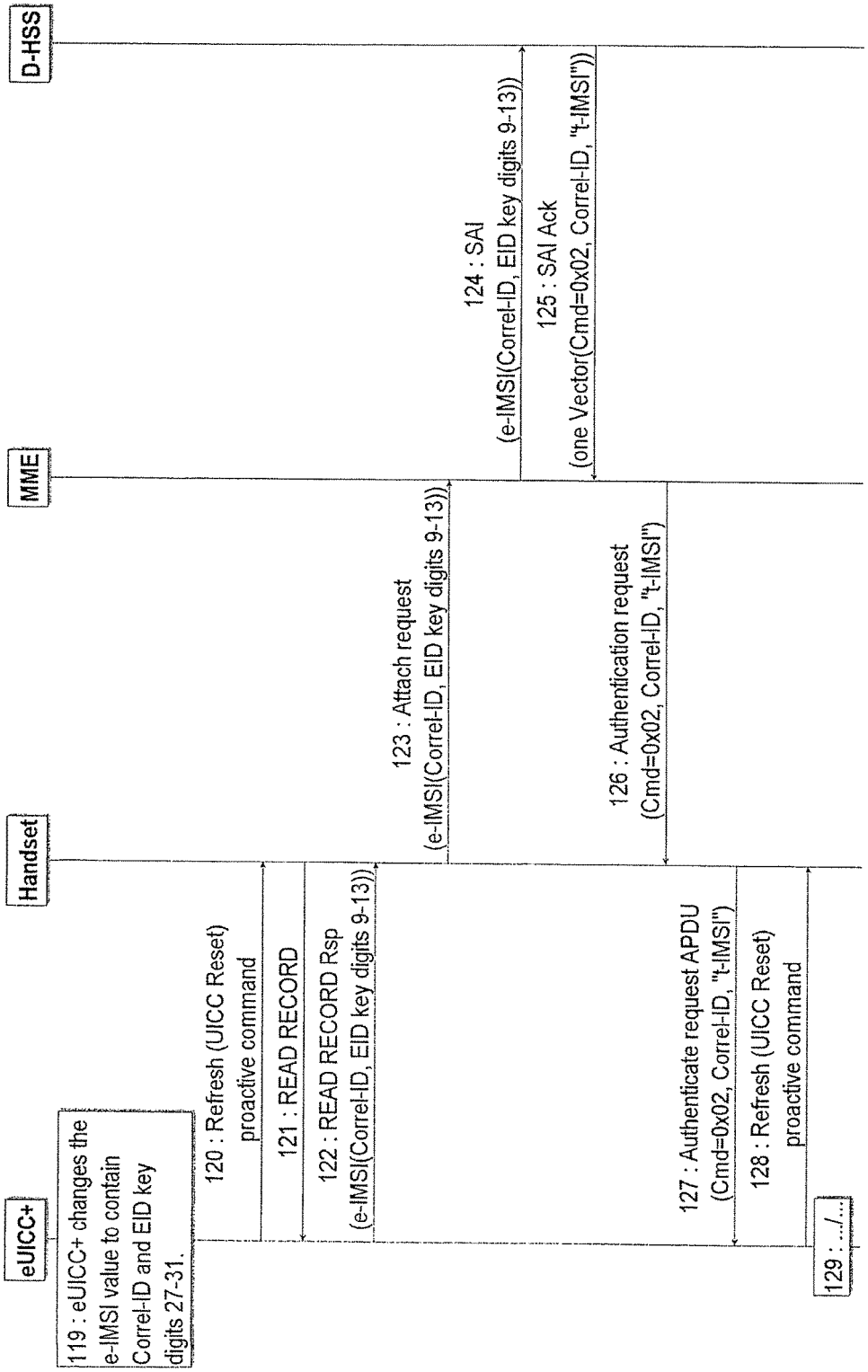
FIG. 10 (part 2)

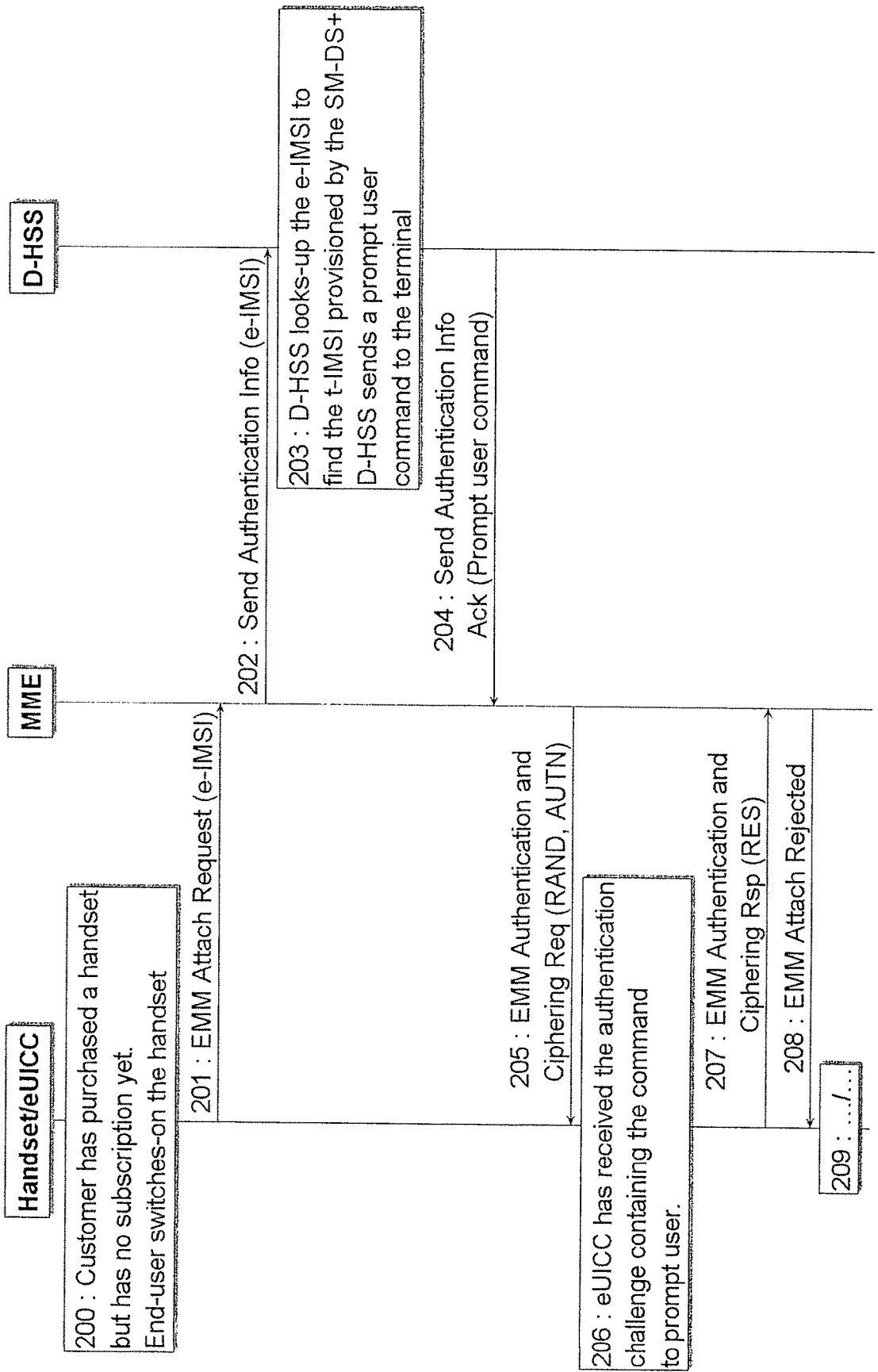
FIG. 14 (part 1)

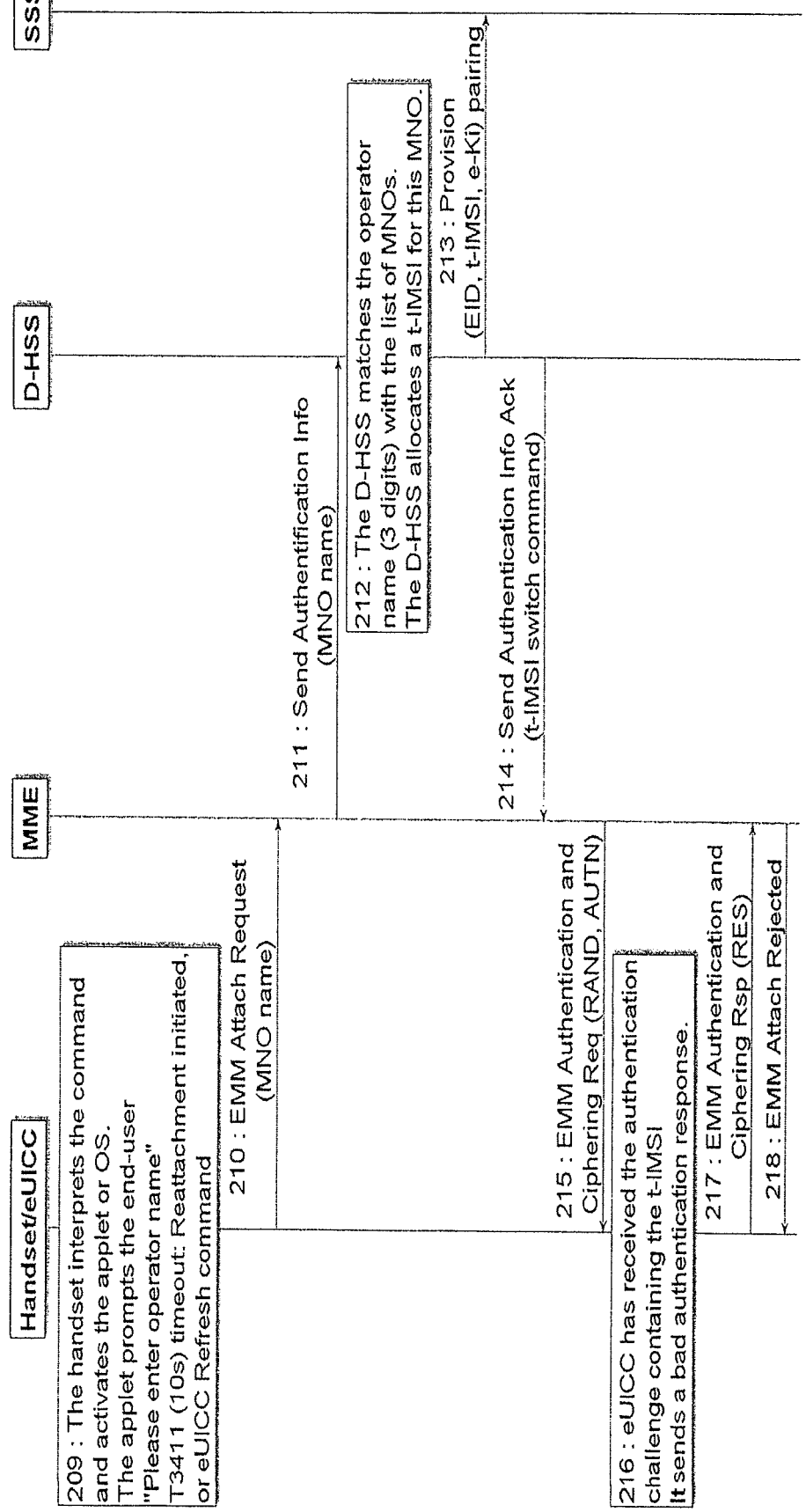
FIG. 14 (part 2)

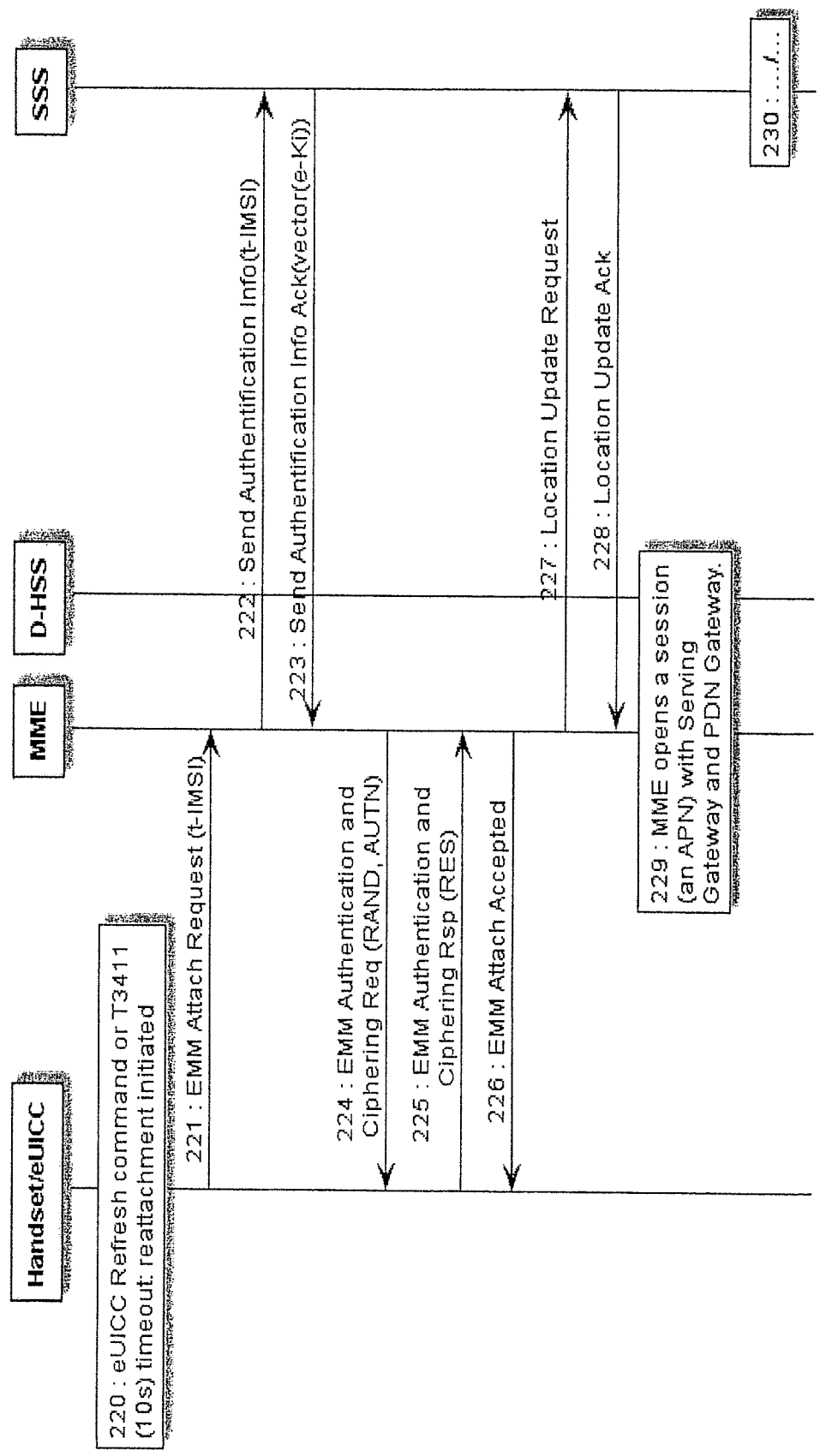
FIG. 15 (part 1)

FIG. 15 (part 2)
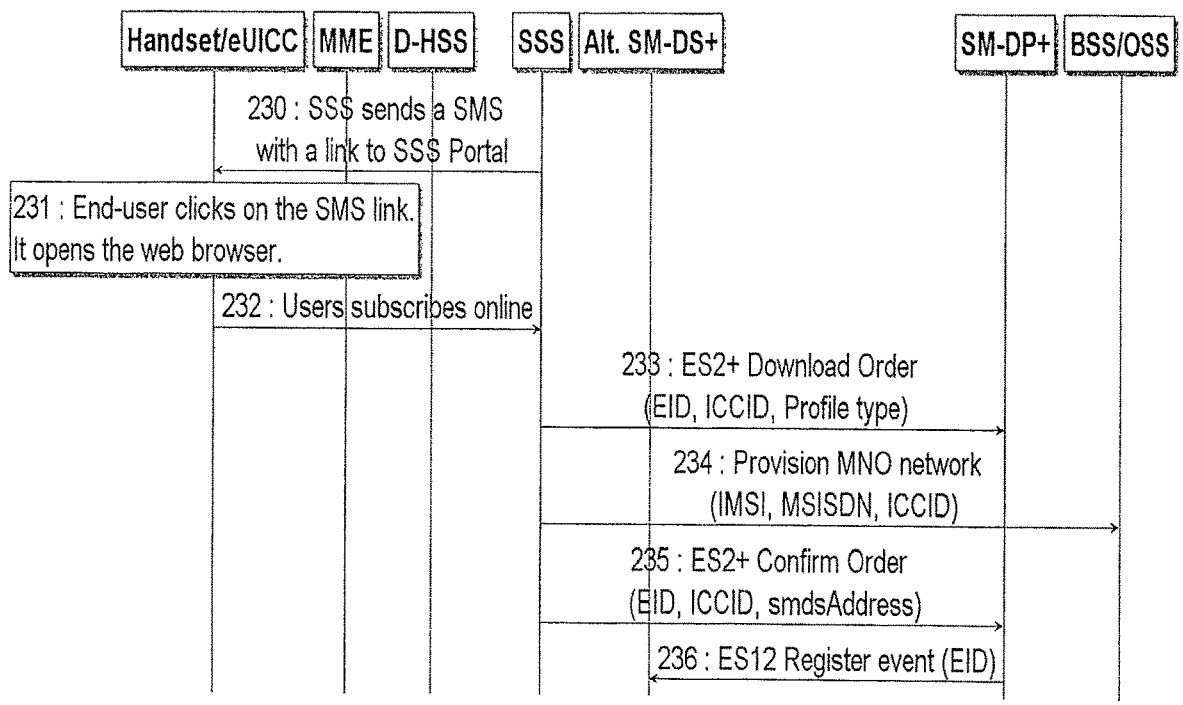

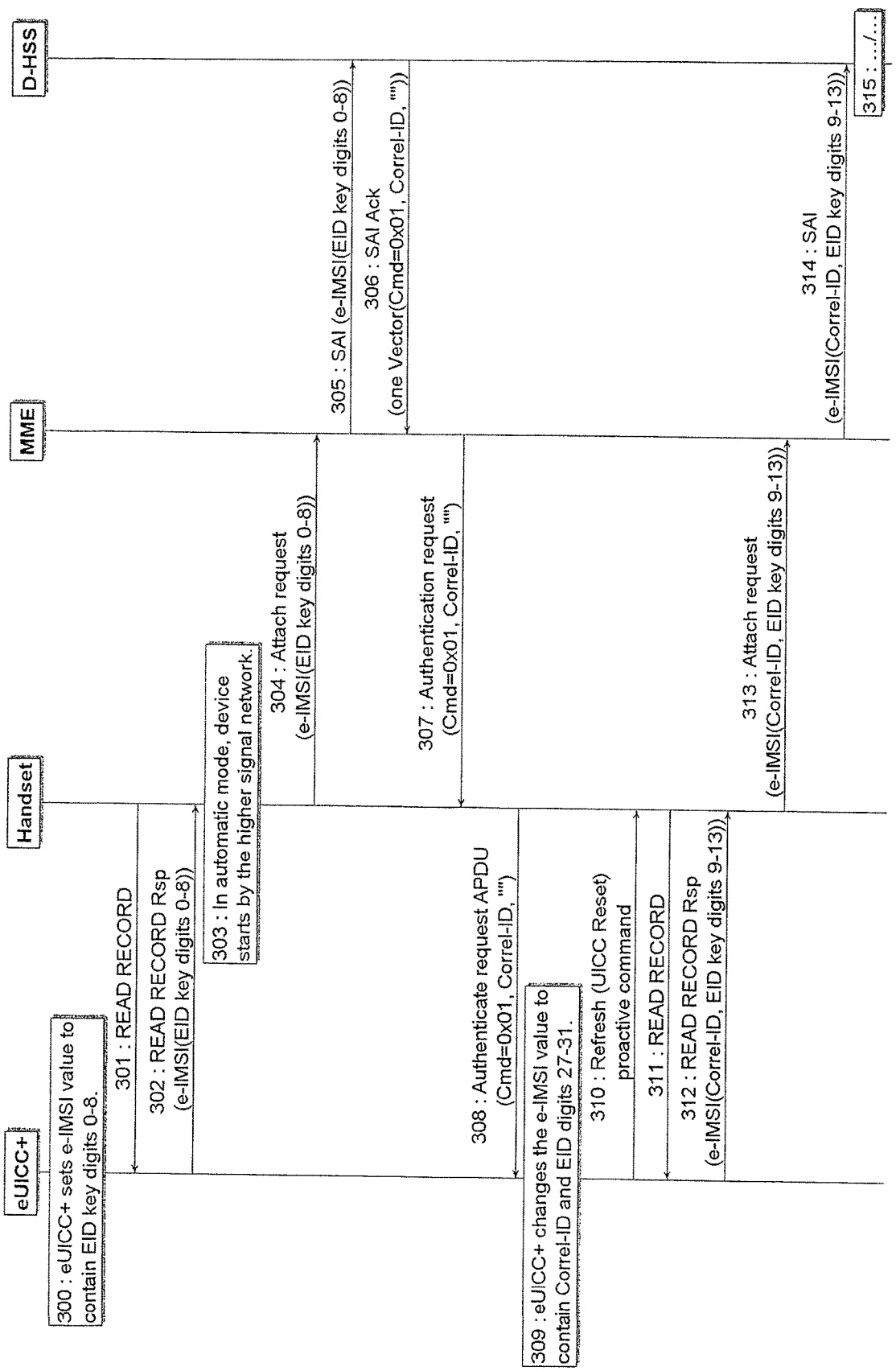
FIG. 16 (part 1)

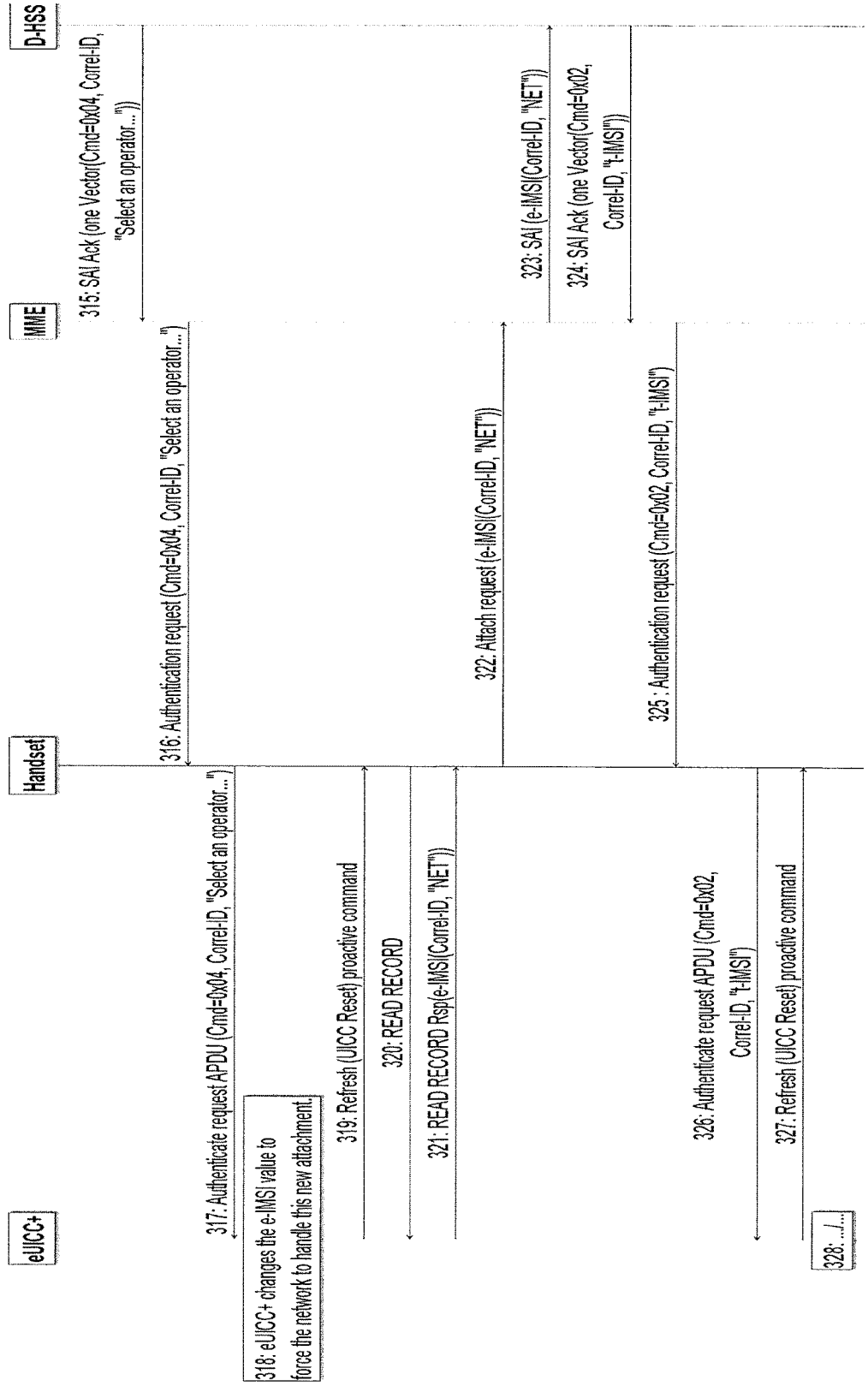
FIG. 16 (part 2)

METHOD FOR TRANSMITTING AN EXISTING SUBSCRIPTION PROFILE FROM A MOBILE NETWORK OPERATOR TO A SECURE ELEMENT, CORRESPONDING SERVERS AND SECURE ELEMENT

The present invention relates to telecommunications and proposes among others a method for transmitting an existing subscription profile from a MNO to a secure element in a cellular telecommunication network, by using only signaling messages. The purpose of the invention is to charge no fees to be paid by the owner of the terminal nor by a Mobile Network Operator (MNO).

In conventional cellular telecommunication networks, a secure element, such as a UICC, a eUICC (embedded UICC) or iUICC (UICC integrated in a chip of a terminal) cooperates with the terminal. The terminal can be a handset, a smartphone, a tablet, a watch, . . .

The secure element comprises a subscription profile (programs, files, keys, file structure, . . . ) allowing a subscriber to enter in communication with the network of a MNO.

When the terminal is powered on, it connects to a base station of this MNO, for accessing to Internet, handling calls, . . . .

However, in some cases, for example in the M2M domain (Machine to Machine), or IoT (Internet of Things), the secure element does not contain any subscription of a MNO. It can only comprise a bootstrap application, an IMSI (International Mobile Subscriber Identity) and a key Ki. Such a situation allows for example the user of the terminal to choose a MNO among a plurality of operators. This solution leads to roaming costs during the profile download when the bootstrap MNO is abroad.

The invention proposes to use modified standardized signaling messages exchanged between a secure element and a server in order to configure remotely (over the air) this secure element without incurring any roaming costs.

Standardized signaling messages are represented in FIG. 1. Such messages are described in ETSI TS 124.008 for 3G and 4G networks.

When a terminal (here a handset) cooperating with a secure element (here a eUICC) is powered on, the handset sends a Read record command to the eUICC. The eUICC answers to this request by sending its IMSI to the handset. The handset then connects to the base station having the strongest signal power and sends an Attach request (along with the IMSI) to a MME (Mobile Management Entity). The MME forwards this IMSI in a SAI(IMSI) message (Send Authentication Info) to the HLR/VLR of the MNO which MCC/MNC correspond to those comprised in the IMSI. The MME and HLR/HSS are servers containing at least a microprocessor for performing their tasks.

The HLR/HSS then answers to the MME by sending him n authentication vectors (RAND & AUTN) in an SAI Ack message. The MME then sends two values, a RAND and an AUTN in an Authentication request message to the handset that forwards them in an APDU command to the eUICC. RAND is used for authenticating the eUICC and AUTN for authenticating the network. The eUICC then computes a value (RES) and sends this value to the handset. The handset forwards the RES value to the MME that compares the received RES with a computed RES' value provided by the HLR/HSS. If RES=RES', a mutual authentication has occurred and further messages can be exchanged between the handset and the network of the MNO, otherwise it has failed and the handset is informed accordingly.

The present invention proposes to use such signaling messages in order to remotely configure a secure element, i.e. without being attached to any operator network, in order to transmit a subscription profile from a MNO to a secure element.

More precisely, the present invention proposes a method for transmitting a subscription profile from a MNO to a secure element cooperating with a terminal the secure element being pre-provisioned with a temporary profile comprising a unique identifier, a first MCC and a first MNC, the method comprising:

Transmitting from a POS of the MNO the unique identifier of the secure element to a SM-DP (403);

Creating or reserving the subscription profile at the SM-DP;

Provisioning in a D-HSS server having the first MCC/MNC the unique identifier and a temporary IMSI comprising a second MCC, a second MNC;

Provisioning in the HSS of the MNO the temporary IMSI and an ephemeral Ki;

At the first attempt of the secure element to connect to the D-HSS server with its temporary profile, exchanging data in signaling messages between the secure element and the D-HSS for provisioning the secure element with the temporary IMSI;

At the next attempt of the secure element to connect to the MNO network with the temporary IMSI, open an APN and send from the SM-DP to the secure element the subscription profile.

Preferably, the signaling messages sent from the D-HSS server to the secure element comprise at least a command, a correlation identifier and data forming part of the temporary IMSI.

The ephemeral Ki is preferably derived from the unique identifier.

The invention also concerns a D-HSS server cooperating with an improved SM-DS server, the D-HSS server being provisioned with a unique identifier of a secure element, and a temporary IMSI for the secure element, the secure element being provisioned with the unique identifier and an ephemeral Ki, the D-HSS server comprising at least a microcontroller comprising instructions for:

when receiving a first signaling attach attempt message of the secure element, sending a message to a HSS of a MNO previously provisioned with the same temporary IMSI and the ephemeral Ki to use the temporary IMSI for a future connection with the secure element;

sending to the secure element in a signaling message the temporary IMSI and a command to switch its current IMSI to the temporary IMSI, in order to allow the secure element to connect to the HSS at a future attach attempt.

The invention also concerns an improved SM-DS server comprising at least a microcontroller comprising instructions for:

when receiving a Register event message from a SM-DP+ with a unique identifier of a secure element cooperating with a terminal, is configured for:

sending the unique identifier to the D-HSS mentioned above with a temporary IMSI;

sending to the HSS of a MNO the temporary IMSI and an ephemeral Ki.

The invention also concerns a secure element comprising an operating system comprising instructions for executing the following steps:

a—sending through the baseband of a terminal with which the secure element is cooperating, in a signaling message an attach request to a server with at least a part of an unique identifier of the secure element provisioned in the secure element;

b—receiving from the server in at least a signaling message a command, a correlation identifier and data comprised in the payloads of the signaling message, the data comprising at least a part of a temporary IMSI;

c—executing the command at the secure element;

d—executing steps a to c until the secure element is provisioned by the server with the temporary IMSI;

e—sending from the secure element an attach request message to the MNO network which MCC/MNC are comprised in the temporary IMSI.

The secure element is preferably an UICC, an eUICC or an iUICC.

The invention concerns also a terminal comprising such a secure element.

Other features and advantages of the present invention will be described below in regard of the following figures that represent:

FIG. 1 has been described in regard of the state of the art (the power-on normal authentication flow (for 3G/4G));

FIG. 2 explains the principle of the invention;

FIG. 3 represents different formats of messages sent from the terminal/eUICC to a server. The eUICC is here an improved UICC having a special OS and is hereinafter called eUICC+;

FIG. 4 represents special messages sent by the server to the eUICC+, these messages having the length of RAND and AUTN messages;

FIG. 5 is a table representing an example of command values used in the messages sent from the server to the eUICC+;

FIG. 8 shows an example of exchanges between the different entities of FIG. 7;

FIG. 9 represents the flow of exchanged signals between the different entities once the subscription has been required for a given eUICC+ at a POS and the steps of FIG. 8 have been executed;

FIG. 10 represents what happens when the eUICC+ communicates with the D-HSS by identifying itself through EID keys;

FIG. 11 represents an example of an EID encoding;

FIG. 14 represents a flow of steps allowing the user of a terminal to select an operator for this second use case;

FIG. 15 shows the subsequent communication between the eUICC+ and the elements of FIG. 13 for the second use case after having executed the steps of FIG. 14;

FIG. 16 shows a detailed flowchart explaining the messages exchanged between the eUICC+ and the D-HSS for the second use case by using again EID keys.

The present invention will now be described in the scope of a 3G or 4G network. The invention is also applicable to 5G networks (and other future networks) as long as signaling messages are exchanged between the secure element and the network on power on of the terminal.

The invention proposes to modify the standard signaling messages sent by an improved secure element and a server in order to remotely configure the improved secure element (hereinafter called eUICC+). This configuration can for example consist in sending a short applet to the eUICC+, to modify its IMSI, to change files in the eUICC+, by using only the signaling channel, i.e. by generating no cost for the end-user of the operator and without WIFI connection.

Figure 2:
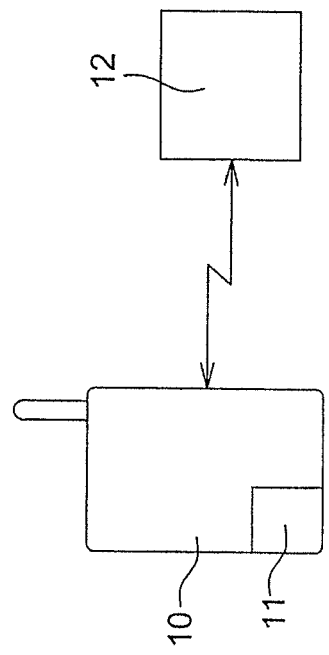

FIG. 2 represents a system where a terminal, for example a handset or a smartphone 10 cooperating with a secure element 11 (a SIM, a UICC, an eUICC or an iUICC for example) communicates with a distant server 12 over the air. The server 12 is also called Discovery HLR/HSS or D-HSS in the following sections. The secure element 11 can be integrated in the terminal 10 or communicating with the terminal through known links like Bluetooth, IrDA, NFC or eGo™ for example.

The secure element 11 is an improved secure element having a special operating system (OS) that connects to the server 12 thanks to its MCC/MNC (that are comprised in its IMSI). The MCC/MNC of this server are also called first MCC/MNC (or MCC1, MNC1).

The standardized IMSI comprises 3 digits for the MCC, either 2 digits (European standard) or 3 digits (North American standard). The length of the MNC depends on the value of the MCC. The remaining digits are the mobile subscription identification number (MSIN) within the network's customer base (9 or 10 digits for the MSIN).

The secure element 11 connects to the server 12 (through the terminal 10) if the MCC1/MNC1 of the IMSI is one of a corresponding MCC/MNC at the level of the server 12. The server 12 can be a discovery server (D-HSS) and the improved OS of the secure element is able to receive and execute commands received in messages having the length of the RAND and/or AUTN messages sent by the server 12 (for 3G or 4G networks). In a 2G network, only a RAND message is sent to the secure element 11 and this RAND message is, according to the invention, modified in order to comprise commands and data.

When the secure element 11 receives the RAND and/or AUTN messages from the server 12, it answers with a modified IMSI field comprising its MCC1/MNC1 and data replacing the standard MSIN.

The communications between the secure element 11 and the server 12 are synchronized thanks to a sequence number that will be called hereinafter Correlation Identifier (Correl-ID) in order that when a message sent by the server 12 to the secure element 11 containing this Correl-ID, the secure element 11 responds to the server 12 with the same Correl-ID. At a given time, the Correl-ID allocated by the server 12 must be different for all the active communication dialogs.

Correl-IDs are preferably changed by the server when it sends a new command to the eUICC+ (for example increase by 1 the last Correl-ID or send a random Correl-ID to the eUICC+) to avoid the network to block the new attachment. If the MCC/MNC of the secure element 11 is different from the server 12, the secure element 11 behaves as a standard secure element (without improved OS) and uses the standard authentication algorithms (for example AKA Milenage or COMP-128) and the known authentication process to connect to the network of its MNO.

The secure element 11 contains a default profile for connecting to the server 12. It comprises at least a key, hereinafter called e-Ki (ephemeral Ki) and a unique identifier, for example an EID (eUICC Identifier), an EID key or an ephemeral IMSI (e-IMSI) that can be derived from the EID). The field ICCID and e-IMSI (standing for envelope-IMSI) are possibly empty. The EID or a key referring to the EID (the EID key) is sent to the server 12 using the envelope-IMSI.

In the next description, "e" stands for ephemeral, "t" for temporary and "p" for permanent. e-data are exchanged between the server and the eUICC+ during a provisioning phase allowing to transmit t-data to the eUICC+ and these t-data are later exchanged between a MNO server and the eUICC+ for installing p-data in this eUICC+.

FIG. 3 represents three possible formats of the IMSI field conveyed in the authentication signaling.

The format 30 is a standard IMSI format. It contains on 3 digits a MCC, on 2 or 3 digits a MNC and on 9 or 10 digits the MSIN of the secure element.

A first format 31 (also called envelope-IMSI format 1) also contains a MCC and a MNC (MCC1 and MNC1) followed by a dedicated digit ("0" for example) and by a payload of 9 digits. This first format 31 is used for the first attempt attach by the eUICC+ to the server 12. It is the first message of a communication dialogue between the eUICC+ and the server 12. The payload contains data to be communicated to the server, these data representing at least a part of the unique identifier of the eUICC+.

A second format 32 (also called envelope-IMSI format 2) is used by the eUICC+ to communicate further data (in a payload) to the server 12 in exchanges occurring after the first attempt attach by the eUICC+ to the server 12 (when having received an answer from the server). It contains the same MCC1/MNC1 as mentioned above followed by a correlation identifier of 5 digits starting by one digit in the range 1 to 9 (the above mentioned dedicated digit is not used as a first digit). This correlation identifier (never starting by 0 in this example) is sent by the server and received back from the server in order to permit to the server 12 to know from which eUICC+ the answer to his command(s) is coming from. This format 32 also contains a payload containing further data sent from the eUICC+ 11 to the server 12 and is used for subsequent messages exchanged between the eUICC+ and the server.

The eUICC+ only uses the format 31 and format 32 messages of FIG. 3 to communicate with the server. It communicates with the server through the baseband of the terminal with which it cooperates.

The server sends to the eUICC+ special messages instead of sending standardized RAND/AUTN messages to the eUICC+. These messages contain data and commands: In at least a RAND message format for 2G and in at least RAND and AUTN formats for networks supporting at least the 3G communications on their signaling channels). For 5G, probably also signaling messages having the purpose of RAND/AUTN messages will be used and these messages will be used for sending commands and data to the secure element.

FIG. 4 represents special messages sent by the server to the eUICC+, these messages having the length of RAND and AUTN messages.

These messages are sent by the server 12 to the eUICC+ 11 instead of traditional RAND/AUTN messages. They have the same lengths than standardized RAND and AUTN messages.

Figure 1:
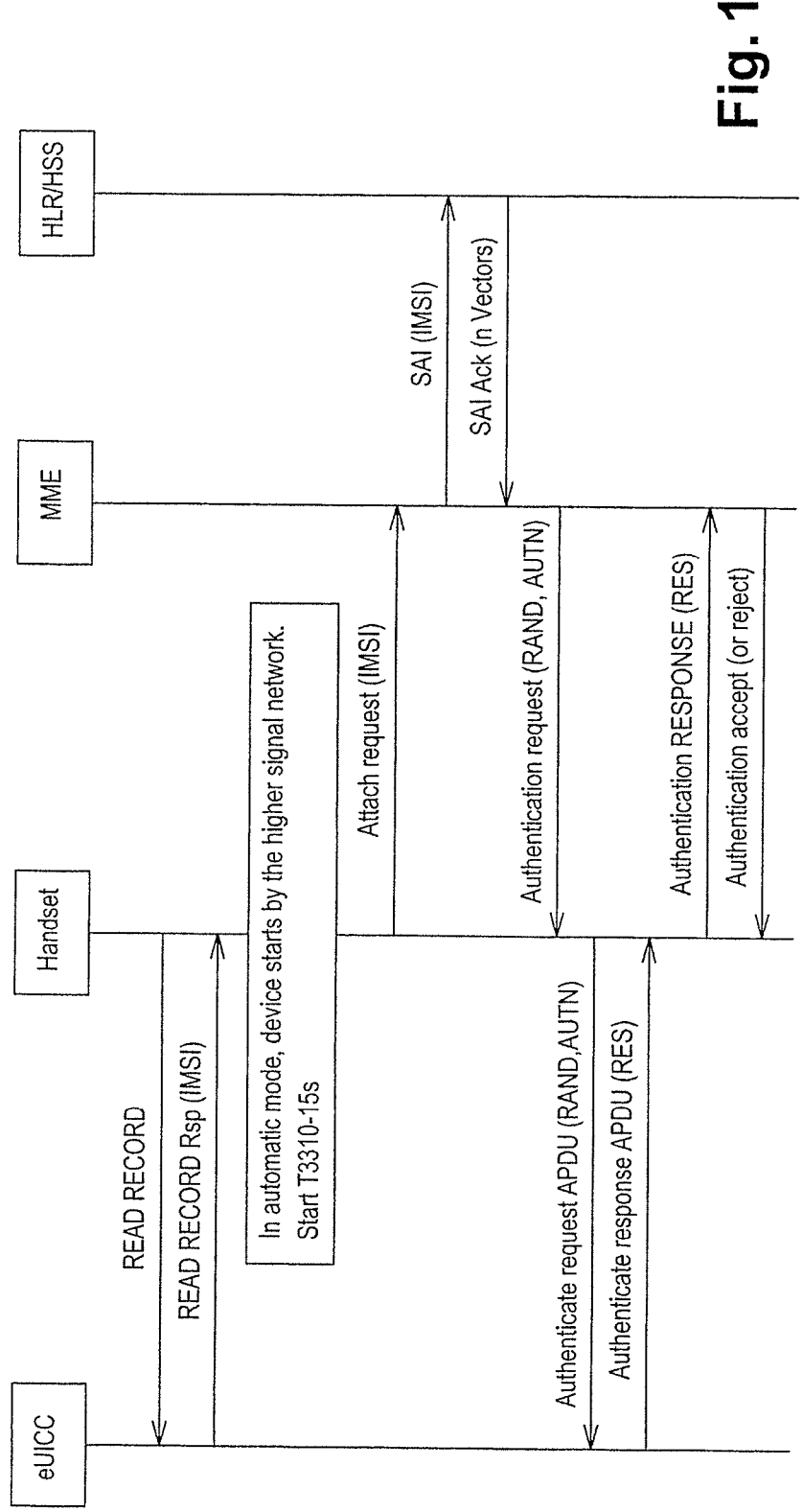

In 3G, 4G and probably future networks (like 5G for example), as explained previously in regard of FIG. 1, signaling messages RAND and AUTN (or others) are sent to the eUICC+. They have both (currently) a length of 16 bytes: The total amount of data which can be carried out from the server 12 to the eUICC+ is therefore 32 bytes.

In the scope of the invention, the OS of the eUICC+ that is comprised in a least a microprocessor is able to detect these special messages (FIG. 4) sent by the server 12.

The server 12 uses for example the structure of FIG. 4 for RAND and AUTN, instead of sending standard RAND and AUTN messages to the secure element 11.

Here, a signaling message 40 comprises:

At least a one byte command (CMD) multiple commands can be stored in this field or in other fields of the message having the RAND format.

A four bytes correlation ID (Identifier) which will be used in the response sent from the eUICC+ to the server 12 (format 32 of FIG. 3). A correlation ID serves to correlate requests and answers between the eUICC+ and the server. Of course, if no answer is required from the eUICC+, it is not necessary to send a correlation ID.

A 27 bytes payload (10 in the RAND and 17 in the AUTN (if not in a 2G network)) whose structure depends upon the command field. The AUTN message containing this payload is referenced 41. This payload is used for sending data from the server to the eUICC+

Of course, the command and Correl-ID can be comprised in the fields of the standard AUTN format instead being comprised in the RAND fields (they are interchangeable).

The eUICC+ OS installed in a microprocessor has instructions able to detect these specials formats.

Of course, if a 2G network is used for transmission messages between the secure element 11 and the server 12, only RAND messages will be sent from the server to the secure element 11 (AUTN messages do not exist in 2G) and the quantity of messages exchanged will be more important since the payload of the AUTN message is not available.

In this 2G case, all commands, Correl-ID (if necessary) and data (payload) are comprised in this RAND format and the eUICC+ working in a 2G network will be able to handle only those special RAND messages.

The command values sent from the server to the eUICC are for example those represented in FIG. 5.

For example, a one byte command 0x02 is a request sent from the server to the eUICC+ to switch its IMSI from an envelope-IMSI (e-IMSI) to a temporary IMSI (t-IMSI). The t-IMSI is typically provisioned in the HSS of a MNO with the key e-Ki. Many other commands can be imagined at it will be seen later.

For example, in a reserved command (0X05 for example), it can be asked to the eUICC+ to update the default SIM profile in the eUICC+. A download of a (small) applet in the eUICC+ can therefore be done by using only signaling messages. This can be done by several exchanges between the server 12 and the eUICC+ (through the special RAND and/or AUTN messages of FIG. 4). All these messages are signaling messages and have no impact on the account of the user or of the MNO (and no WIFI connection is needed).

Thanks to the method proposed by the present invention, a bidirectional and secure communication channel between a server and a secure element cooperating with a terminal in a cellular telecommunication network is established by using only signaling messages.

First of all, the secure element 11 sends a first attachment request signaling message to the server 12, the first message comprising the MCC1/MNC1 of the server and at least a first part of an unique identifier of the eUICC+. This unique identifier can for example be its EID. This part of the unique identifier is contained in the payload of the format 31 message. The server receives this first attachment request and identifies the payload field. It then associates to this first message a correlation identifier to follow the dialog. The server then sends to the secure element, in at least a first signaling message (having here the length of a RAND message and instead of a standard RAND message):

At least a command (CMD);

A correlation identifier (Correl-ID) if further messages have to be sent from the secure element to the server;

A first payload comprising data (see format of the RAND message 40 of FIG. 4). The payload bytes 0-10 are used when only a RAND message can be sent to the eUICC+ (2G) and an additional payload 11-26 can be used in case where 3G or 4G networks are available (data comprised in the payload of signaling message 41).

After that, the eUICC+ executes the command(s) received by the server.

If necessary, the secure element, in at least a second attachment request signaling message sends the same MCC1/MNC1 and in an updated MSIN field, the received correlation identifier and a second payload containing data to the server. These exchanges of data/commands are going on until the two entities (eUICC+ and server) have completed their dialog.

The invention can take place in different use cases.

Two different use cases will be described below.

Figure 6:
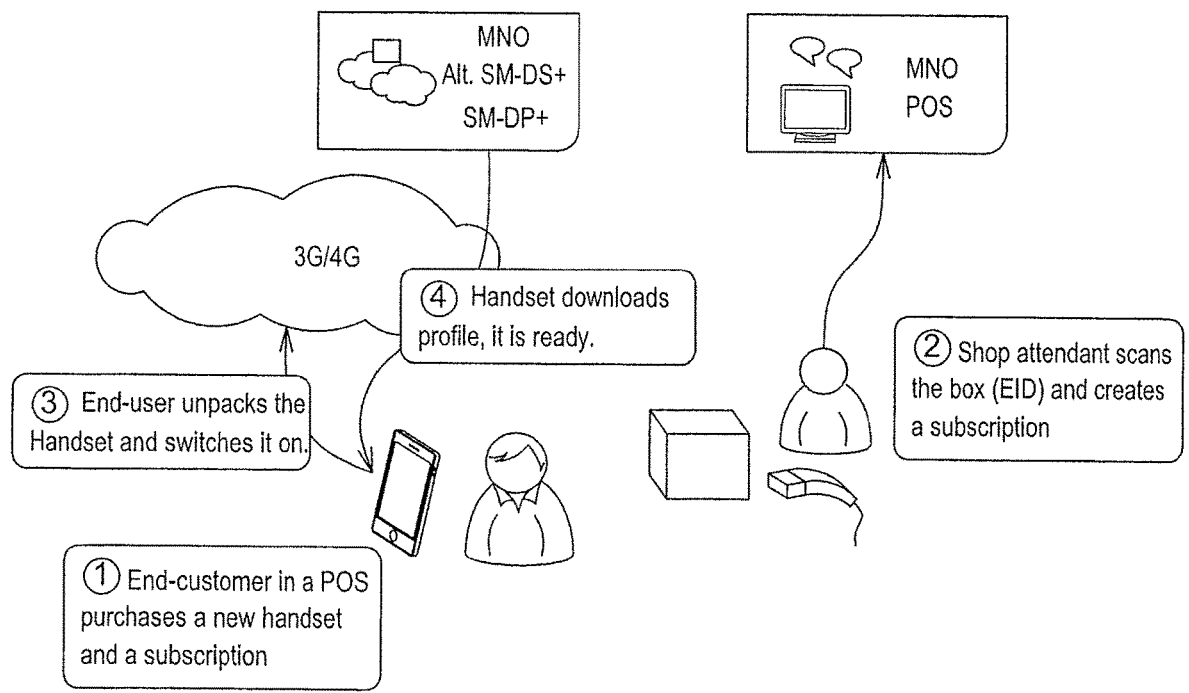
FIG. 6 is a simplified view of a first use case of the invention allowing to download a subscription already provisioned by a MNO in a secure element.

In the first use case represented in FIG. 6, an end-user purchases in a POS (Point of Sales—step 1) of a MNO a new terminal (for example a handset) cooperating with a eUICC (embedded or not) and has chosen a subscription with this MNO. The shop attendant (step 2) scans the EID (ID of the eUICC) printed on the box of the handset and a SM-DP+ (Subscriber Manager Data Preparation) creates a subscription. After these steps, the customer can switch on his handset (step 3) and the MNO downloads the subscription on the eUICC (step 4).

However, according to GSMA's RSP Architecture Specification SGP.21 (version 2.0, dated Aug. 23, 2016, V2.0), the WIFI access is mandatory to perform the download of the subscription. This access can be identified as a pain for subscribers. The WIFI in some regions has no high penetration rate at home. Even in the USA, the percentage reaches only 58%. In others continents as Africa the WIFI penetration rate is extremely low. Moreover a large percentage of the population encounters problems to configure the WIFI on their devices which leads to key issues to download a MNO subscription profile.

In the scope of the invention, not only a downloading of a subscription profile comprises all programs, files, keys, file structure, . . . allowing a subscriber to enter in communication with the network of a MNO is proposed, but also a mutual communication between a secure element and a server by using only transmission channels that are not charged by a MNO by using signaling channels.

Without a WIFI access the subscription cannot be downloaded to the eUICC, which can lead to non-adoption of the eUICC in part of the world.

One solution would be to propose an initial attachment based on a bootstrap profile which allows to attach the device to a network and perform through a roaming agreement the download of the subscriber profile. However, this leads to roaming cost to download the profile since the eUICCs are manufactured without knowing in which countries they will be sold/used. Therefore, there is no possible selection of the targeted MNO or MVNO.

The present invention proposes a solution to this issue, while being compliant with the GSMA and 3GPP standards.

In the first use case, the invention proposes to simplify the user experience when an end-user has purchased a smartphone or any telecommunication terminal and wishes to download from a MNO (Mobile Network Operator) a subscription on the secure element cooperating with his terminal. The secure element can be an UICC, an eUICC (embedded UICC, UICC standing for Universal Integrated Circuit Card) or an iUICC (integrated UICC that is a secure element integrated in a processor of the terminal) with no Wi-Fi access to download through the MNO network his/her reserved subscription. The invention applies to 2G (GSM), 3G (UMTS), 4G (LTE) and 5G (IoT) networks and is GSMA and 3GPP compliant.

The GSMA's RSP Architecture Specification SGP.21 (version 2.0, dated Aug. 23, 2016, V2.0) provides a standard mechanism for the remote provisioning and management of consumer business devices, allowing the over WIFI provisioning of an initial operator subscription, and the subsequent change of subscription from one operator to another.

Figure 7:
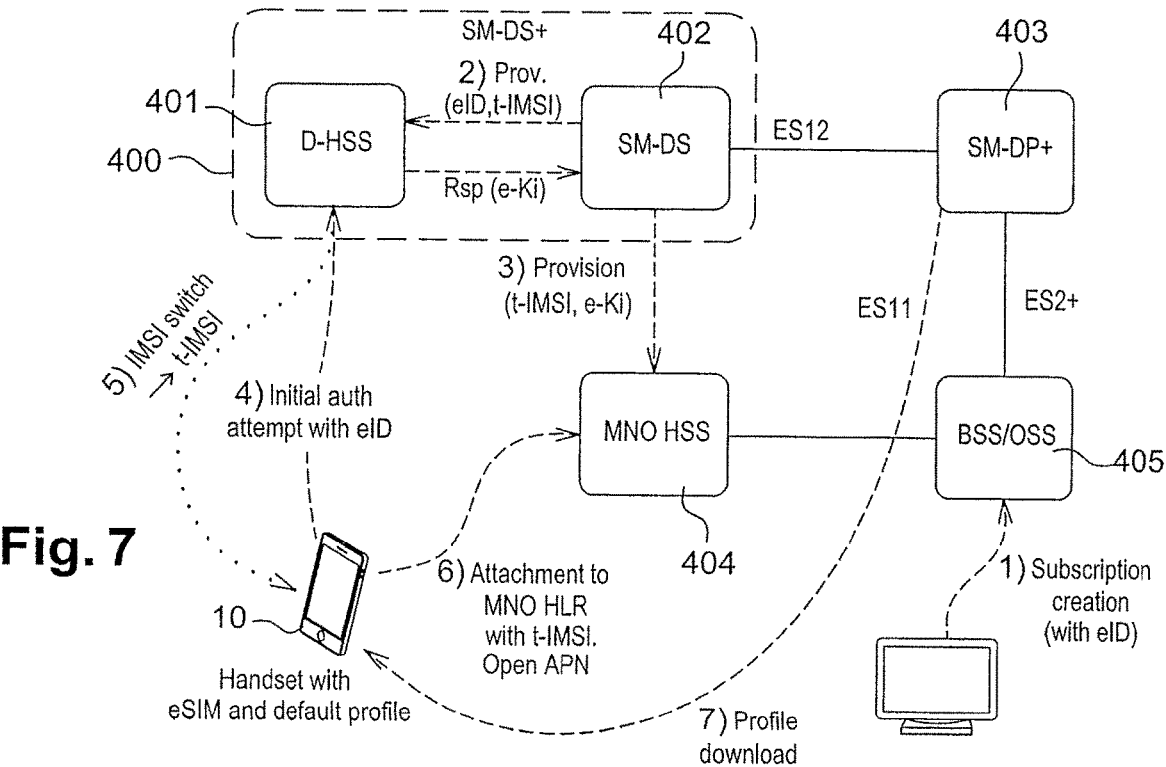
FIG. 7 represents an example of a system according to the invention for this first use case.

FIG. 7 explains the first use case being the object of this invention.

In this FIG. 7, an enhanced SM-DS 400 (Subscription Manager—Discovery Server) is here called SM-DS+ (or first server). A SM-DS is for example described in SGP.21 RSP Architecture Version 2.0, Aug. 23, 2016. The SM-DS+ 400 is compatible with GSMA phase 2 standards SGP 11—"RSP Architecture—Version 2.0" and GSMA SGP 22—"RSP Technical Specification—Version 2.0—Clean Version—19 Aug. 2016".

The SM-DS+ server 400 comprises a server 401 called D-HSS (Discovery Home Subscriber Server or Home Location Register) or second server and a SM-DS 402 (third server). The D-HSS 401 controls the first attachment of the handset 10 during its first switch-on thanks to the MCC/MNC code of the IMSI. The SM-DS+ 400 is linked to a SM-DP+ server 403 (Subscriber Manager Data Preparation). The SM-DS+ 400 and the SM-DP+ 403 are servers belonging to a first entity, for example to a eUICC manufacturer (eUM).

The SM-DP+ 403 server has the function to manage Profile Packages, secure each with a Profile protection key, store Profile protection keys in a secure manner as well as the Protected Profile Packages in a Profile Package repository, and link the Protected Profile Packages to specified EIDs. The SM-DP+ 403 server binds Protected Profile Packages to the respective EID and securely downloads these Bound Profile Packages to the LPA (Local Profile Assistant) of the respective eUICC. A SM-DP+ server is also specified in SGP.21 RSP Architecture Version 2.0 of Aug. 23 2016.

FIG. 7 also represents a HSS 404 and a BSS/OSS 405 (business support system/operations support system). The HSS 404 and the BSS/OSS 405 typically belong to a second entity, typically an operator (MNO).

The SM-DS+ 400 contains an alternative SM-DS 402 server which is connected to the SM-DP+ 403 server used by the MNO. For regular eUICC it just behaves the standard way. For an enhanced eUICC (that will hereafter be called eUICC+), having a default profile, it improves and simplifies the end-user experience.

The eUICC+ (noted eSIM in FIG. 7) default profile must contain or have generated an ephemeral Ki (e-Ki) to be able to communicate with the MNO HSS 404 and contains a bootstrap application. The initial authentication message sent from the eUICC+ to the D-HSS 401 (thanks to its MCC/MNC) is routed to the D-HSS which is connected to the signaling network through a visited network to which the eUICC+/terminal connects the first time (the BTS of the MNO having the strongest signal).

The D-HSS server 401 uses the 2G/3G/4G signaling channel (MAP for 2G and 3G and diameter for 4G/LTE and also diameter or another signaling channel for the future 5G) to send commands to the handset and its eUICC+. It comprises at least a microprocessor studied for executing these tasks. The D-HSS 401 can send different commands to the handset 10 either to display menu on the handset 10 or to switch the eUICC+ default profile IMSI and to redirect the handset attachment to the user-selected MNO.

Broadly explained, the system is working on the following manner:

The eUICC+ comprises a bootstrap application, an unique identifier like an EID, a first MCC/MNC (to communicate with the D-HSS), and an e-KI that can be derived from the EID. When a eUICC+ has been manufactured, its personalization center enters the EID of the eUICC+ (scans for example the EID in the form of a barcode or QR code printed on the box containing the handset) in the BSS/OSS of the corresponding MNO. This corresponds to step 1 of FIG. 7. The SM-DP+ prepares a subscription including a permanent (definitive) IMSI (p-IMSI) and Ki (p-Ki) (among other files, applications, file system, . . . ) and informs the SM-DS+. The SM-DS+ informs the D-HSS of a pending download for this EID with a t-IMSI (step 2) and the D-HSS 401 derives from the EID an ephemeral Ki (e-Ki) that is transmitted to the SM-DS 402. At step 3, the MS-DS+ provisions the HSS of the MNO 404 with a temporary IMSI (t-IMSI) and the ephemeral Ki e-Ki.

A pool of t-IMSI is provided by the MNO having subscribed to the service is provisioned in the SM-DS+. Later on, when the final subscription profile (with p-IMSI and p-Ki) is downloaded in an e-UICC, this t-IMSI can be re-used by the MNO for another e-UICC. Next (step 4), when a customer has bought a handset or terminal 10 containing this eUICC+ containing the EID, the handset 10 is first powered on and tries to authenticate itself to the best received network with one of its unique identifiers (that can be an e-IMSI, its EID or a EID key for example) by a signaling message (authentication request message). This network relays the authentication request to the D-HSS that recognizes the received unique identifier as being a eUICC+ with a pending subscription and sends as described in FIG. 8 the provisioned t-IMSI paired to this unique identifier to the eUICC+.

The D-HSS then sends a command in a special signaling message having the length of the known signaling messages AUTN and RAND (for 3G and 4G networks) to the eUICC+ (step 5) for ordering the eUICC+ to replace its e-IMSI by the associated t-IMSI. The eUICC+ then proceeds to an IMSI swap (from e-IMSI to t-IMSI). At the next authentication request (step 6), the eUICC+ will use t-IMSI and be routed to the HSS of the chosen MNO (since it has been provisioned with t-IMSI having the MCC/MNC code of the operator of the HSS 404). The key e-Ki provisioned in the eUICC+ and in the HSS will then be used for authentication purposes and for downloading the subscription profile. The MNO can then inform the SM-DP+ that he can download (step 7) the final subscription on the eUICC+, with p-Ki and p-IMSI (p standing for permanent as already said), this final subscription profile being created at this moment or reserved in advance in the SM-DP+.

In summary, the dialog between the SM-DS+ and the eUICC+ uses the 2 first messages exchanged during the device attachment. The Send Authentication Info message sends a dynamic (changing) IMSI including the unique identifier (for example the EID). The Send Authentication Info response includes (instead RAND and AUTN parameters) data and commands to be transmitted to the eUICC+. These 3 parameters are used to exchange and execute commands and data between the eUICC+ and the D-HSS.

This dialog between the eUICC+ and the D-HSS server allows to identify automatically the device through its EID for example based on the 3GPP standard using enhanced authentication messages including command/data.

This enhanced attachment phase uses a worldwide Discovery HLR/HSS (D-HSS) connected to MNO SM-DS+ to configure the eUICC+ to attach to the targeted operator network. This enhanced authentication phase doesn't attach the device to the worldwide Discovery HLR/HSS network. Only the first couple of messages send authentication info are exchanged over the D-HSS. This mechanism is not charged over the operator networks and no chargeable data are exchanged. During the enhanced authentication dialog between the eUICC+ and the D-HSS, the D-HSS configures remotely the eUICC+ through a command in the RAND and/or AUTN parameters to swap the eUICC+ e-IMSI to the targeted or pending operator HLR/HSS by sending to this e-UICC+ the t-IMSI known by the MNO.

The enhanced attachment phase of the invention uses an enhanced eUICC (eUICC+) comprising a modified operating system when its MCC/MNC (first MCC/MNC) pertains to an operator handling the D-HSS. This modified OS comprises instructions permitting the initial exchanges with the server 12. Thanks to this modified OS, the RAND and AUTN messages that will be disclosed later are decoded by the eUICC+ and the e-MSIN field is re-encoded with a response to these messages. If the eUICC is a standard eUICC, the authentication procedure is standard (AKA/ Milenage is used, or COMP 128). Said otherwise, the eUICC+ performs this enhanced authentication phase analysis if the current IMSI is based on the Discovery HLR/HSS MCC/MNC, otherwise the eUICC performs the standard authentication phase (e.g. AKA Milenage algorithm).

Thanks to this mechanism the eUICC+ subscription profile download is possible through the targeted operator (with a second MCC/MNC) network without Wi-Fi access.

A signaling flow example is described below regarding FIG. 8 that shows in more details an example of exchanges between the different entities of FIG. 7. This example is based on transmissions in a 4G network.

A step 50, a customer purchases a terminal in the shop of a MNO, for example a handset, a PDA or a smartphone comprising a secure element, for example an extractible UICC+ or an embedded UICC+ (eUICC+). At step 51, the shop attendant scans the EID that is for example printed on the box of the handset.

The customer can also have ordered his terminal on Internet and asks the representative of the MNO to create a subscription.

At step 52, the EID, ICCID and profile type are sent to the SM-DP+ in a download order. The profile type depends on the subscription chosen by the customer (prepaid, postpaid, international, . . . ). At step 53, this order is confirmed with an alternative SM-DS address (the alternative SMDS address is the address of the SM-DS+).

The SM-DP+ then creates or reserves a subscription profile for this EID.

At step 54, The SM-DP+ sends a Register event message to the Alt. SM-DS+ (Alt. corresponds to Alternative a Root SM-DS can also be used) containing the EID, the RSP (Remote Sim Profile) server address (address of the SM-DP+) and an Event ID. Steps 50 to 54 are standard steps defined by the GSMA.

The SM-DS+ then allocates, at step 55, a temporary IMSI called t-IMSI to this eUICC+ and at step 56 asks to the D-HSS to provision a pair EID/t-IMSI for this eUICC+. The D-HSS has the first MCC/MNC codes (MCC1 and MNC1).

The t-IMSI has a second MCC/MNC code (MCC2 and MNC2). The SM-DS+ sends also at step 57 to the HSS of the targeted MNO a request to provision the t-IMSI with its ephemeral Ki (e-Ki).

Steps 50 to 56 can also take place before having sold the handset to the customer. The subscriptions are therefore already available at the level of the MNO and ready to be downloaded to the eUICC+ when the user will power on his terminal.

Later, at step 58, the customer switches on his terminal. At step 59, the baseband of the terminal sends an EMM Attach Request with its unique identifier being an e-IMSI to the MME. The e-IMSI (format 31 message) contains essentially the first MCC1/MNC1 codes and a payload that contains a 9 digit complete identifier of the eUICC+ (typically an EID key coded on 9 digits). The MME sends the e-IMSI to the D-HSS (thanks to the recognized MCC1/MNC1 code) at step 60 through the network of a MNO having the strongest signal received by the terminal.

At step 61, the D-HSS looks up the received payload (9 digits EID key) and associates this e-IMSI to the provisioned t-IMSI at step 56. The D-HSS also sends to the eUICC+ through the MME an IMSI switch command in the RAND and/or AUTN fields as it will be detailed later.

At step 62 a vector containing this command is sent to the MME and at step 63, the MME sends the RAND and AUTN to the eUICC+ in an Authentication request message to initiate a challenge/response communication. The RAND/AUTN messages contain t-IMSI.

At step 64, the eUICC+ checks if the current MCC and MNC (MCC1 and MNC1) correspond to those of its Discovery Server and, if yes, executes the switch order of its e-IMSI to the t-IMSI comprised in the RAND and AUTN messages.

In this example, a single exchange of messages is necessary between the eUICC and the D-HSS since the D-HSS can recognize the eUICC by a single message (steps 59-61) containing the entire EID key.

At step 65, the eUICC+ answers to the MME that authentication has failed in order to not be connected to the D-HSS. It can send a wrong RES (nil value for example) or send a code to the terminal in order that the terminal does not answer.

At step 66, the MME confirms to the eUICC+ that authentication has failed.

At step 67, thanks to a refresh command or after a given time laps (for instance 10 seconds), the eUICC+ tries to attach to the MNO's network with the second MCC/MNC received in the RAND and AUTN messages. It sends here its t-IMSI to the MME at step 68 in an EMM Attach Request (t-IMSI) message. The t-IMSI comprises a second MCC (MCC2), a second MNC (MNC2) and a temporary MSIN.

At step 69, the MME sends this t-IMSI to the HSS of the MNO (identified by the second MCC/MNC) and at step 70 the HSS answers with an Authentication Info Ack Vector.

At step 71, the MME sends an authentication and cyphering request containing RAND and AUTN and (at step 72), the eUICC+ answers with RES. At step 73, authentication has succeeded and the MME informs the eUICC+. An update location request message can then be sent to the HSS of the MNO (step 74) that acknowledges with a Location Update Ack message (step 75).

Finally, at step 76, the MME can connect to an APN (Access Point Name) with a serving gateway and a PDN gateway. The terminal can then connect itself to the MNO via Internet and the MNO will be able to download a subscription in the eUICC+.

FIG. 9 represents the flow of exchanged signals between the different entities once the subscription has been required for a given eUICC+ at a POS and the steps of FIG. 8 have been executed. This mechanism is compatible with GSMA standard SGP.22-RSP Technical Specification.

At step 80, the user powers on his handset and the LPA connects to root the SM-DS by an InitiateAuthentication (eUICC+Challenge, eUICC+info1, SM-DS Address) message (step 81). The SM-DS+ answers with an OK message (step 82).

At step 83, the handset sends to the SM-DS+ for authentication purposes a AuthenticateClient(eUICC+Signed1, eUICC+Signature1, CERT.EUICC+.ECDSA, CERT.EUM.ECDSA) message. CERT.EUICC+.ECDSA is the certificate of the eUICC+ for its public ECDSA (Elliptic Curve cryptography Digital Signature Algorithm) key and CERT.EUM.ECDSA is the certificate of the EUM for its public ECDSA key. The SM-DS+ answers with an OK message (step 84) containing the address of the SM-DP+.

At step 85, the LPA retrieves the SM-DP+ address from the queried SM-DS event and, at step 86, sends a InitiateAuthentication (eUICC+Challenge, eUICC+info1, SM-DP Address) message to the SM-DP+. The SM-DP+ answers with an OK message (step 87).

At step 88, the eUICC+ sends a AuthenticateClient (eUICC+Signed1, eUICC+Signature1, CERT.EUICC+.ECDSA, CERT.EUM.ECDSA) message (the same message as at step 83) to the SM-DP+. The SM-DP+ answers with an OK message (step 89).

At step 90, the eUICC+ requests to the SM-DP+ the subscription with a GetBounfProfilePackage(transactionID) message. The SM-DS+ sends to the UICC at step 91 the requested package. This package comprises the subscription profile and a permanent (final) IMSI and a permanent Ki (p-IMSI/P-Ki).

At step 92, the user clicks on a LPA button to enable the new profile and force future re-attachment with the new profile and p-IMSI.

At step 93, the eUICC+ requests to the MME an attachment by using t-IMSI. The MME then sends an Authentication Info comprising t-IMSI to the HSS of the MNO. The HSS answers to the MME at step 95 by sending an Authentication Info Ack(vector(Ki)).

At step 96, the MME sends a EMM Authentication and Ciphering Request message containing RAND and AUTN to the eUICC+. The eUICC+ answers with RES (step 97) and the attachment of the eUICC+ to the EMM is accepted at step 98.

Finally, the MME sends a location update request at step 99 to the HSS that answers with an acknowledgement at step 100.

Steps 80 to 100 are standard steps standardized by the GSMA (see SGP.22, version 2.0 of Oct. 14, 2016, chap. 6.5.2.6 and annex I). FIG. 9 thus shows the OTA flow through the LPA.

The invention described in the previous section requires that the eUICC+ and the D-HSS are capable to use the authentication signaling to exchange data during the initial attachment attempt. The mobility management messages are specified in 3GPP TS 24.008 Mobile radio interface Layer 3 specification; Core network protocols; Stage 3 for 3G and in 3GPP TS 24.301 Non-Access-Stratum (NAS) protocol for Evolved Packet System (EPS); Stage 3 for 4G/LTE.

FIG. 10 represents a solution where the eUICC+ encodes the available digits of format 31 with an EID key.

The eUICC+ sends data within the MSIN (while keeping the MCC1/MNC1 unchanged).

The D-HSS can reply by commands and parameters encoded within the RAND/AUTN fields.

The e-IMSI encoding scheme is for example the following:

The eUICC+ is built with a default profile. The default profile contains a MCC1 and MNC1 that are routable to the D-HSS. Then the e-IMSI MSIN value (MSIN) is changed from one authentication transaction to the other. The eUICC+ uses two formats of e-IMSI:

a unique e-IMSI allocated by the eUM manufacturer. This is the "format 31" in FIG. 3.

a modified e-IMSI carrying a payload: It is the "format 32" in the FIG. 3.

The initial e-IMSI MSIN can be mapped to/from the eUICC+ EID by the eUM which has issued the eUICC+ and keeps the mapping in a database. There are 9 billions of e-IMSI values which are mapped to the eUM EIDs. There is one trillion EID values for the eUM: e-IMSI.

When the D-HSS communicates with the handset/eUICC+, it encodes the RAND and AUTN messages traditionally transmitted in mobile networks.

FIG. 4 represents an example of RAND and AUTN encoding.

RAND and AUTN lengths are 16 bytes: The total amount of data which can be carried out from the D-HSS to the eUICC+ is therefore 32 bytes (for 3G, 4G and 5G networks).

The eUICC+ uses for example the following structure for RAND and AUTN:

A one byte command.

A four bytes correlation ID (Identifier) which is used in the next message sent from the eUICC+ to the D-HSS (format 32). A correlation ID serves to correlate requests and answers.

A 27 bytes payload (10 in the RAND and 17 in the AUTN) whose structure depends upon the command field.

The command values are for example those represented in FIG. 5. For example, a one byte command 0x02 is a request sent from the D-HSS to the eUICC+ to switch its IMSI from e-IMSI to t-IMSI. Many other commands can be imagined.

FIG. 11 represents an example of an EID encoding.

The EID contains for example 32 numerical digits as shown. EIDs are defined in GSMA's Technical Specification "Remote Provisioning Architecture for Embedded UICC" Version 3.1, May 27, 2016. To identify a eUICC+ issued by a eUM, only the digits 18-29 (EID individual identification number) which really identify the individual eUICC+ need to be known by the D-HSS. The eUICC+ preferably never communicates directly those digits but a key of 14 digits which the D-HSS can use to retrieve the eUM eUICC+ record table. This key is called EID key and is associated with an EID. The EID key is generated from the EID in the eUICC+. In parallel, the D-HSS is provisioned with EID and computes a corresponding EID key. Ephemeral IMSIs are not long enough for handling billions or eUICC+ and this is why e-IMSIs are associated to EID keys. At the level of the D-HHS, a table associates each EID key to each EID.

The EID or EID key is thus composed of the EID individual identification number. It is possible to send from the eUICC+ the EID or the EID key (or at least a part of it if the D-HSS does not need to know all the digits of this data) but for security reasons, it is preferable to send an EID key instead of an EID on signaling channels.

Returning to FIG. 10, the eUICC+ uses two failed authentication transactions:

1. In the first transaction, the eUICC+ provides the e-IMSI containing the digits [0-9] of the EID or EID key. The D-HSS provides a correlation Id and requests the subsequent EID or EID key digits with a 0x01 command.

2. In the second transaction, the eUICC+ provides the received correlation Id and the digits [10-13] of the EID or EID key. The D-HSS looks up its database to find an entry provisioned by the SM-DS+ for this eUICC+ end-user subscription. The D-HSS allocates a temporary IMSI and forces an e-IMSI switch to this t-IMSI.

In FIG. 10, EID keys are sent from the eUICC+ to the D-HSS but these keys could be replaced by the real EID (EID individual identification number).

More precisely, at step 110, at a first attempt of the eUICC+ to connect to the network, the eUICC+ sets the e-IMSI value to contain the digits 0 to 8 of the EID key. When the terminal sends at step 111 a read record APDU to the eUICC+, it responds with 8 bytes containing the first 9 digits of the key (step 112). At step 113, the terminal connects to the network having the strongest signal and sends to the MME an attach request message containing these digits (step 114). At step 114, format 31 of FIG. 3 is used. At step 115, these digits are transmitted to the D-HSS.

At step 116, the D-HSS sends a command 0X01 as represented in FIG. 9 (please send me the remaining 3 digits) along with a correlation ID. This command is transmitted to the eUICC+ through the MME and the terminal (steps 117 and 118). At step 119, the eUICC+ changes the e-IMSI value to contain the received Correl-ID and the EID digits 27-31 and sends a Refresh command to the terminal (step 120). After a second read record (step 121), the eUICC+ sends in its e-IMSI field the received correlation ID and the EID key bytes 9-13 (step 122).

At step 123, format 32 of FIG. 3 is used and the last bytes of the key are transmitted to the D-HSS (step 124). The D-HSS can then associate the received key with the t-IMSI of the eUICC+.

The D-HSS then (step 125) sends a command 0X02 to the eUICC+ in order to switch its e-IMSI to the t-IMSI transmitted along with another correlation ID. This command is transmitted to the eUICC+ (steps 126 and 127) that switches its e-IMSI to its t-IMSI. When the eUICC+ receives this command, it shall change the e-IMSI value of its default profile to the value t-IMSI specified in the 15 first bytes of the RAND+AUTN payload.

It shall then send a REFRESH proactive command to force the handset to reattach with the new t-IMSI value (step 128). Thanks to this t-IMSI value, the eUICC+ will be able to connect to the network of the operator (the process continues with step 129 that corresponds to step 64 of FIG. 8).

Step 129 shows that exchanges can continue on this basis between the eUICC+ and the D-HSS for further purposes.

It has to be noted that if the EID key is no longer than 9 digits, only one exchange of messages is necessary between the eUICC+ and the D-HSS. In this case, step 125 follows immediately step 115 (the D-HSS has identified the eUICC+ and can send it the t-IMSI. This is also the case if a short EID key is used or if the e-IMSI of the UICC+ does not exceed the length of 9 digits. In these cases, the eUICC+ sends only one message of format 31. Format 32 message(s) are not used. It is then not necessary to send Correl-ID messages to the eUICC+.

A precise example will now be described.

A eUICC+ is provisioned with:

EID: 12346578901234567890123456789012 (32 digits)

EID key: 10000000000212 (14 digits)

and this eUICC+ has a default profile comprising:
- e-IMSI: 208511234567890 (15 digits), with MCC=208 (France), MNC=51 (NETWORK) and MSIN=1234567890. This e-IMSI is optional if the EID or the EID key is transmitted to the D-HSS.
- e-Ki: AE1F5E55BC4254D4EE451112E4AA15E7 (for communicating with the MNO).

If, in a first case, the e-IMSI is sent from the eUICC+ to the D-HSS, the attachment request will be SAI (208511234567890) and in return it will get in the RAND message format 0X02 and the t-IMSI. The eUICC+ will then replace e-IMSI by t-IMSI.

If, in a second case, the EID key is sent from the eUICC+ to the D-HSS, the e-IMSI is computed and written in the eUICC+: 208510100000000.

The first attachment message will be SAI (208510100000000). In return, the eUICC$_+$ will receive in the RAND format message a command 0X01 and a correlation ID 1234.

After computation, the field of the MSIN will be replaced by 208511123400212 with 1123400212 being in the field of the MSIN.

And the second attachment will be SAI (208511123400212).

In return, the eUICC+ will receive in the RAND message format 0X02 and the t-IMSI and will replace e-IMSI by t-IMSI.

Of course, if RAND and AUTN messages can be sent to the eUICC+, the number of exchanges of signaling messages will be shorter.

Concerning the protocols, APDU are exchanged between the eUICC+ and the terminal, Mobility Management EMM between the terminal and the MME and diameter or MAP between the MME and the D-HSS.

In order to perform several time attachment/authentication cycles with different IMSI, the eUICC+ uses Refresh commands (TS 102 223) or AT commands. This allows to the handset baseband module to send to a MME an EMM Attach Request in a timely and controlled manner.

Figure 12:
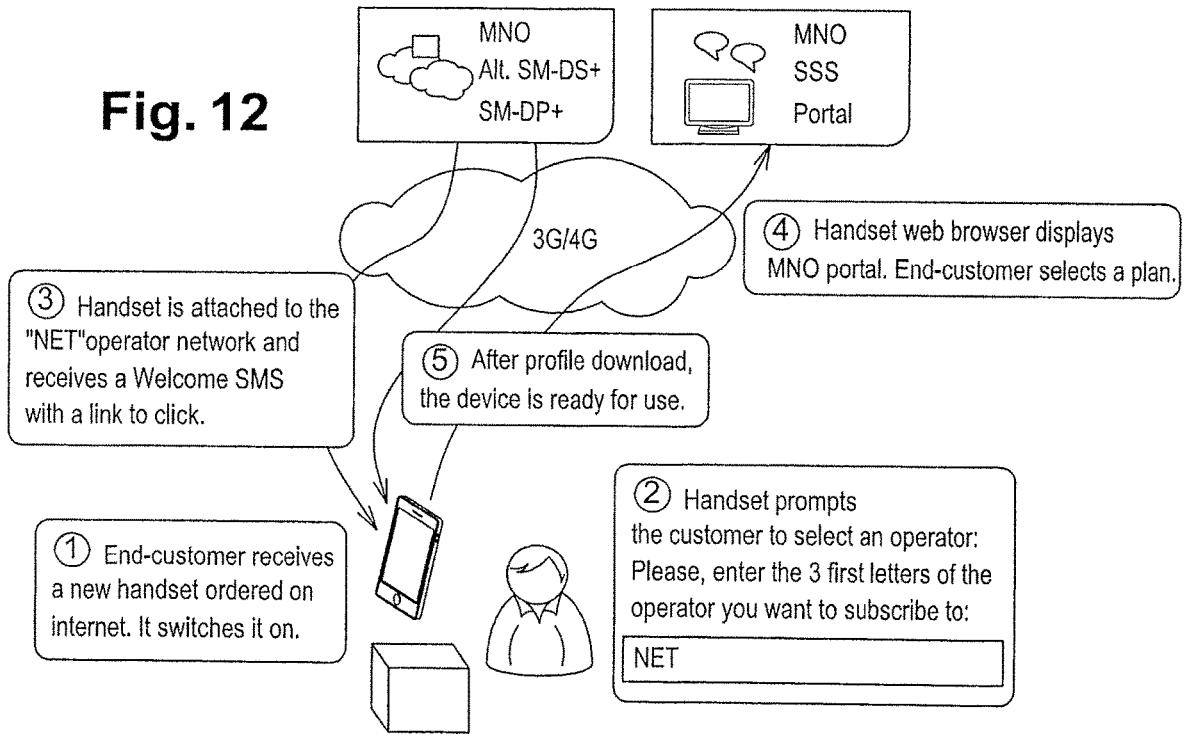
FIG. 12 shows a second use case of the invention.

FIG. 12 shows a second use case of the invention.

The second use-case is enabled by the SM-DS+: The end-user can subscribe anywhere just switching on her/his handset. If the end-user selects an operator who is using the SM-DS+ of the EUM, the end-user will subscribe through few steps. If the end-user selects an operator who is not using the SM-DS+ of this EUM, a message will be prompted on the handset inviting the end-user to go to an MNO shop.

Few steps are here necessary:
- In a first step, the end-user receives a new handset ordered for example on Internet. The handset comprises a eUICC+. It switches it on.
- In a second step, the OS of the eUICC+ prompts the customer to select an operator. He enters for example 3 digits corresponding to the operator (here "NET") from which he wishes to obtain a subscription.
- In a third step, the handset is attached to the network of this operator and receives a SMS with an Internet link to click.
- After having clicked on the link, in a fourth step, the handset web browser is connected to the MNO portal and the end-user can select a subscription profile.
- In a final fifth step, the subscription profile is downloaded in the eUICC+ by the MNO's SM-DS+ and the terminal is ready for use.

Figure 13:
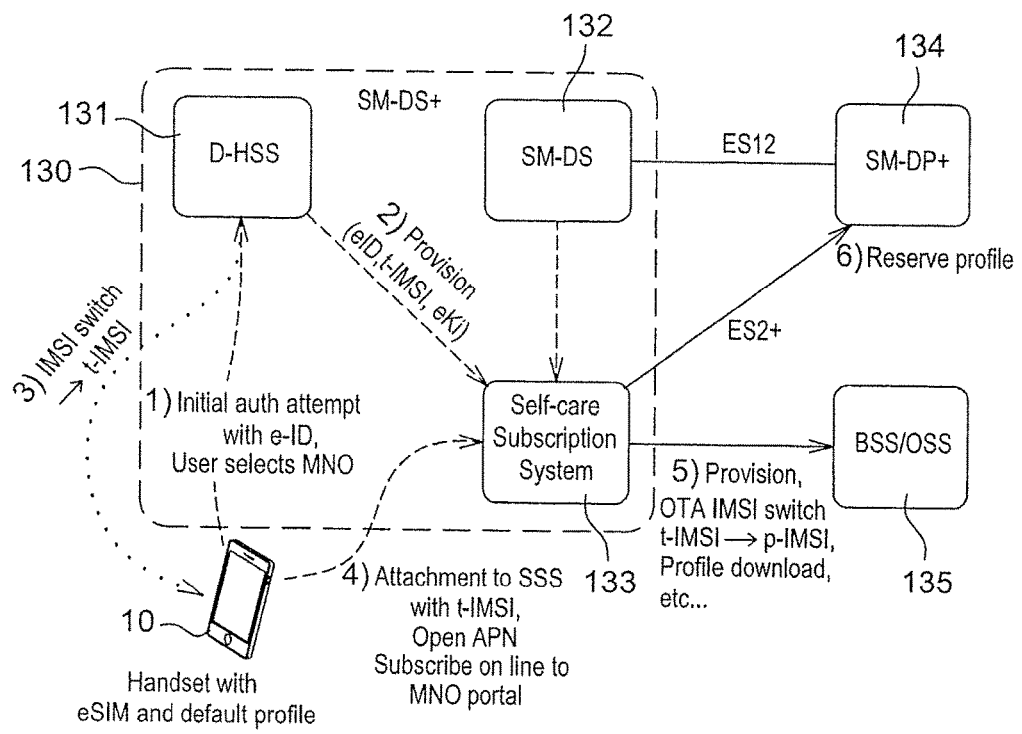
FIG. 13 shows an example of an architecture of the SM-DS+ for this second use case.

FIG. 13 shows the architecture of the SM-DS+ for this second use case.

Here, the SM-DS+ server 130 contains a system called Self-care Subscription System 133 (hereinafter SSS or fourth server). It contains also a D-HSS 131 and a SM-DS 132. The SM-DS is linked through an ES12 connection to a SM-DP+ 134 and to the SSS 133. The SSS 133 is also linked through an ES2+ connection to the SM-DP+ and to the BSS/OSS 135 of an MNO. The fourth server SSS 133 contains a temporary HLR and provisioning system. When no subscription exists for a eUICC+, the eUICC+ sends a prompt command to the user and the user enters an abbreviated name of a MNO or a code corresponding to this MNO in his terminal. A list of different MNOs can be proposed to the user who selects one of them. The D-HSS associates this abbreviated name or code to the name of a MNO and if this MNO has subscribed to the service with an alt. DS+, the MNO has provisioned the D-HSS with a pool of t-IMSIs. The D-HSS then sends a command to the eUICC+ in order to realize a swap of IMSI to attach to this MNO with one of these t-IMSIs and ask online for a subscription.

More precisely, when in a first step a eUICC+ cooperating with a terminal containing an unique identifier like an EID (or EID key) attempts to authenticate to the D-HSS 131 with its EID (in one or more steps as it has been explained previously through exchanges of signaling messages), the D-HSS 131 detects that it has no t-IMSI pending (as for use case 1) for the EID sent by the eUICC+. As for the use case 1, two exchanges occurred for transmitting the EID (or EID key) of the eUICC+ to the D-HSS.

The D-HSS 131 sends back in messages having the length of RAND/AUTN messages to the eUICC+ a sequence number (Correl-ID) and a command to display the message «Please Enter the Name of Your Selected Operator»

The user then enters e.g. NETPHONE as the chosen operator.

The e-UICC+ sends a message with MCC/MNC, the sequence number and NET (an identifier identifying the operator chosen by the user), all in digits to the D-HSS 131.

The D-HSS 131 identifies the sequence number and the originating network from this authentication request (the country where the device is powered-on). Based on the country and the NET decoded from the message, the D-HSS 131 identifies NETPHONE as the operator in the country who get the Discovery Service. The D-HSS 131 sends the EID, t-IMSI and the e-KI to the SSS of NETPHONE. NETPHONE provisions in his network this t-IMSI, e-KI and EID.

The D-HSS 131 sends to the device (e-UICC+) in the messages RAND/AUTN (with another sequence number eventually) the t-IMSI to the eUICC+ and the order to swap the IMSI.

The device 10 then attaches to the MNO SSS with t-IMSI. Then the subscriber through a web portal selects his/her subscription and the download of the subscription can be launched through LPA/SM-DP+.

These different steps will be explained in more details in FIGS. 14 and 15.

FIG. 14 represents a flow of steps allowing the user of a terminal to select an operator (its e-UICC+ does not contain any subscription, but only a bootstrap application, an ephemeral-Ki and the MCC/MNC code of the D-HSS and an unique identifier).

At step 200, a customer has purchased a handset but has no subscription yet. The end-user switches-on the handset.

At step 201, the handset sends to a MME an EMM Attach Request comprising a format 31 message. The digits after the MCC/MNC can contain either an MSIN or an EID (or EID key) or a part of them.

At step 202, the MME sends to the D-HSS a message Send Authentication Info (e-IMSI).

A plurality of exchanges of signaling messages can occur in order to receive a complete unique identifier of the secure element (in case that an e-IMSI, an EID or an EID key cannot be sent in only one shot).

At step 203, the D-HSS looks-up the EID to find the t-IMSI provisioned by the SM-DS+ but does not find any correspondence because it has not been provisioned with a t-IMSI. It sends then a command to prompt the user to select an operator into RAND and AUTN format messages.

At step 204, the D-HSS sends to the MME an Authentication Info Ack (Prompt user command) and the MME (at step 205 sends an EMM Authentication and Ciphering Req (RAND, AUTN) to the eUICC+. At step 206, the eUICC+ has received the authentication challenge containing the command to prompt the user.

At step 207, the eUICC+ sends a bad RES value to the MME as a response and at step 208, the EMM attachment is rejected.

At step 209, the handset interprets the command and activates an applet or the OS. The applet or OS prompts the end-user to enter the name of the operator from which he wishes to obtain a subscription by displaying on the screen of the handset a message "Please enter operator name". The user then enters the name of his chosen operator.

After a timeout (for ex. 10 seconds) or a eUICC+ Refresh command, the reattachment is initiated and at step 210 the eUICC sends to the MME an Attach Request with the name of the chosen MNO.

At step 211, the MME sends to the D-HSS an Authentication Info message containing the name of the MNO.

At step 212, the D-HSS matches the operator name (on 3 digits for example) with the list of MNOs and allocates a t-IMSI for this MNO or retrieves a t-IMSI from the MNO.

At step 213, the D-HSS provisions a triplet (EID, t-IMSI, e-Ki) in the chosen MNO SSS.

The MNO SSS, as it will be seen later is able to order a subscription profile to be downloaded in the secure element from a provisioning server.

At step 214, the D-HSS sends to the MME a t-IMSI switch command in a message
Authentication Info Ack (t-IMSI switch command). This message is sent (step 215) through an instruction to the eUICC+ in a message EMM Authentication and Ciphering Req (RAND, AUTN).

At step 216, the eUICC+ has received the authentication challenge containing the t-IMSI and sends back a bad authentication response (at step 217 a wrong RES is sent back in order that the eUICC+ does not attach to the D-HSS). The MME then answers (step 218) that the EMM attachment has been rejected.

The eUICC+ is now provisioned with the t-IMSI of its MNO and it will be possible to connect to his network for obtaining a subscription.

FIG. 15 shows the subsequent communication between the eUICC+ and the elements of FIG. 13.

At step 220, the eUICC+ receives a Refresh command or after a 10 s timeout, tries to attach to its MNO network with t-IMSI (step 221—message EMM Attach Request (t-IMSI) sent to the MME). The MME, at step 222, sends an Authentification Info(t-IMSI) message to the SSS that answers at step 223 with a message to the MME Send Authentification Info Ack(vector(e-Ki)). The SSS by receiving t-IMSI, associates it with e-Ki.

At step 224, the MME sends a message EMM Authentication and Ciphering Req (RAND, AUTN) to the eUICC+.

Since the eUICC+ knows t-IMSI and e-Ki, it calculates a correct RES and sends it at step 225 to the MME. The MME answers (step 226) that the attachment of the eUICC+ is accepted.

The MME then sends at step 227 a Location Update Request message to the SSS that answers with a message Location Update Ack (step 228). The MME can then (step 229) open a session (a Web portal through an APN) with the Serving Gateway and PDN Gateway of the SSS in order to select a subscription.

At step 230, the SSS sends a SMS with a link to SSS Portal to the handset/eUICC+. The end-user clicks on the link received in the SMS to open a web browser (step 231).

At step 232, the user asks for subscribing online to the SSS and chooses a subscription (prepaid, postpaid, international, . . . ). At step 233, the SSS sends to the SM-DP+ a Download Order (EID, ICCID, Profile type) message and provisions the BSS/OSS of the MNO with at least a permanent IMSI and a MSISDN (step 234). The ICCID of the eUICC+ can also be transmitted to the BSS/OSS.

At step 235, the SSS confirms the order (EID, ICCID, smdsAddress) by submitting to the SM-DP+ the address of the SM-DS+.

At step 236, the SM-DP+ sends a Register event (EID) message to the SM-DS+ in order to inform it that it has a subscription ready for the eUICC+.

After step 236, the same process represented in FIG. 9 for the first use case is launched again for this second use case (download of a subscription in the eUICC+).

FIG. 16 shows a detailed flowchart explaining an example of messages exchanged between the eUICC+ and the D-HSS for this second use case.

In this figure, the eUICC+ identifies itself at the D-HSS with its EID key having a length of 14 digits.

At step 300, the eUICC+ sets its e-IMSI value to contain EID key digits 0-8. The handset sends at step 301 a Read Record command to the eUICC+ and the later answers at step 302 by sending a response READ RECORD Rsp(e-IMSI(EID key digits 0-8)).

At step 303, the handset connects to the network having the strongest signal power and sends at step 304 an attachment request message Attach request (e-IMSI(EID key digits 0-8)) to the MME. At step 305, the MME sends to the D-HSS a message SAI (e-IMSI(EID key digits 0-8)).

At step 306, the D-HSS answers with a message SAI Ack (one Vector(Cmd=0x01, Correl-ID, " ")) in order to obtain the remaining EID key digits. At step 307, the MME sends to the handset an Authentication request (Cmd=0x01, Correl-ID, " ") message that is forwarded to the eUICC+ through an APDU command (step 308).

At step 309, the eUICC+ changes the e-IMSI value to contain the received correl-id and the EID key digits 27-31. At step 310, the eUICC+ sends a Refresh (UICC Reset) proactive command to the handset that answers (step 311) with a READ RECORD command. The eUICC+ answers (step 312) with a message READ RECORD Rsp(e-IMSI (Correl-Id, EID key digits 9-13)).

The handset sends then an Attach request (e-IMSI(Correl-Id, EID key digits 9-13)) message to the MME (step 313) and the MME sends to the D-HSS a SAI (e-IMSI(Correl-Id, EID key digits 9-13)) message at step 314. The D-HSS now knows all the keys of the EID and can associate them to the real EID of the eUICC+.

At step 315, the D-HSS sends to the MME a SAI Ack (one Vector(Cmd=0x04, Correl-ID, "Select an operator . . . ")) command in order to allow the user to select an operator among a list of available operators.

As indicated in FIG. 5, when the eUICC+ receives a command 0x04, it shall use the STK to prompt the end-user with the message provided in the payload.

This command is transmitted to the eUICC+ (steps 316: Authentication request (Cmd=0x04, Correl-ID, "Select an operator . . . ") and 317: Authenticate request APDU (Cmd=0x04, Correl-ID, "Select an operator . . . ")). At step 318, the eUICC+ collects the digits entered by the end-user in his handset (here, the end-user has chosen an operator which abbreviation is "NET" standing for NETPHONE). The end-user can enter the entire operator name (letters or numerical digits (A-Z and 0-9)). 100.000 values can be encoded into the 5 digits of format 32 payload of FIG. 3. For example, the three first digits of the operator name are encoded in the payload of the IMSI.

At step 319 the eUICC+ is reset by a REFRESH proactive command to force the handset to reattach with the new IMSI value. At step 320, the handset sends a Read Record command to the eUICC+ that answers with a READ RECORD Rsp(e-IMSI(Correl-Id, "NET")) response (step 321). At step 322, the handset sends to the MME a Attach request (e-IMSI (Correl-Id, "NET")) message and at step 323, the MME sends a SAI (e-IMSI(Correl-Id, "NET")) message to the D-HSS. The D-HSS answers (step 324) with a SAI Ack (one Vector(Cmd=0x02, Correl-Id, "t-IMSI")) to the MME. The D-HSS has a list of t-IMSIs that correspond to t-IMSIs allocated to each operator. As shown in FIG. 9, the command sent along with the t-IMSI (having the MCC/MNC of this operator) is a switch command from e-IMSI to t-IMSI.

The MME then sends an Authentication request (Cmd=0x02, Correl-ID, "t-IMSI") message to the handset (step 325) and the handset sends to the eUICC+ an Authenticate request APDU (Cmd=0x02, Correl-ID, "t-IMSI") at step 326. The Correl-ID is here facultative since the D-HS is not requesting an answer from the eUICC+.

The eUICC then replaces e-IMSI by t-IMSI and sends a Refresh (UICC Reset) proactive command to the handset (step 327).

As indicated by 328, other steps can take place afterwards, namely the steps of FIG. 15 for downloading a subscription from the chosen operator.

All the elements represented in the figures comprise at least a microprocessor comprising instructions for executing the different steps exposed above.

If the user of the terminal wishes to sell or give his terminal to another user (and delete his subscription on his terminal), an application can be foreseen in the eUICC+ in order to reset the p-IMSI to the e-IMSI. The new owner of the terminal can then launch again the method of the invention by contacting the D-HSS server by using the first MCC/MNC comprised in the e-IMSI (or the UID (key) of the eUICC+).

The invention allows to create a dialog between a device and a discovery server SM-DS+ without being attached to a cellular network nor using WIFI connectivity, with the objective to attach to the selected or targeted operator network among the hundreds of network operators to download the subscription profile with its credential. The invention is designed for 2G, 3G and LTE networks without standard modifications. The invention is also applicable to 5G networks.

The invention claimed is:

1. A secure element comprising a default profile with an e-IMSI whose MSIN field is initially empty and an operating system comprising instructions for executing the following steps:
   a- computing the MSIN field of the e-IMSI to contain a unique identifier of said secure element;
   b- sending through a baseband of a terminal with which said secure element is cooperating, in a signaling message an attach request to a server with an e-IMSI containing the unique identifier of said secure element provisioned in said secure element;
   c- receiving from said server in at least a signaling message, a command, a correlation identifier and data comprised in payloads of said signaling message, said data comprising at least a part of a temporary IMSI;
   d- executing said command at said secure element;
   e- executing steps b to d until said secure element is provisioned by said server with said temporary IMSI;
   f- sending from said secure element an attach request message to an MNO network which MCC/MNC are comprised in said temporary IMSI.

2. A terminal comprising a secure element according to claim 1.

* * * * *